(12) United States Patent
Navali et al.

(10) Patent No.: US 11,252,454 B2
(45) Date of Patent: Feb. 15, 2022

(54) SYSTEM, DEVICES AND METHODS FOR PROVIDING STREAM PRIVACY IN AN ABR OTT MEDIA NETWORK

(71) Applicant: TELEFONAKTIEBOLAGET L M ERICSSON (PUBL), Stockholm (SE)

(72) Inventors: Prabhudev Navali, Westford, MA (US); Raj Nair, Lexington, MA (US); Mikhail Mikhailov, Newton, MA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 465 days.

(21) Appl. No.: 16/022,185

(22) Filed: Jun. 28, 2018

(65) Prior Publication Data

US 2019/0007756 A1 Jan. 3, 2019

Related U.S. Application Data

(60) Provisional application No. 62/526,146, filed on Jun. 28, 2017.

(51) Int. Cl.
*H04N 21/845* (2011.01)
*H04L 29/06* (2006.01)
(Continued)

(52) U.S. Cl.
CPC ... *H04N 21/23655* (2013.01); *H04L 63/0428* (2013.01); *H04L 65/4084* (2013.01); *H04L 65/605* (2013.01); *H04L 65/607* (2013.01); *H04L 65/608* (2013.01); *H04L 65/80* (2013.01); *H04N 21/23439* (2013.01);
(Continued)

(58) Field of Classification Search
CPC . H04L 65/4084; H04L 65/605; H04L 65/607; H04L 65/608; H04L 65/80; H04L 12/2854; H04L 67/02; H04L 65/4076; H04L 65/1026; H04L 65/1069;
(Continued)

(56) References Cited

U.S. PATENT DOCUMENTS

| 8,849,950 B2 | 9/2014 | Stockhammer et al. |
| 2007/0209005 A1 | 9/2007 | Shaver et al. |

(Continued)

OTHER PUBLICATIONS

Reed et al., Identifying HTTPS-Protected Netflix Videos in Real-Time, Mar. 22-24, 2017, ACM, pp. 361-368. (Year: 2017).*

(Continued)

*Primary Examiner* — Muhammad Raza
(74) *Attorney, Agent, or Firm* — The Danamraj Law Group, P.C.

(57) ABSTRACT

A method for providing privacy during delivery of ABR media content to a plurality of ABR OTT client devices includes receiving, at a network node that includes a Controlled Cache, an ABR manifest for an ABR media asset. The ABR manifest includes a segmentation-units index. Responsive to receiving a request for the ABR media asset from an ABR OTT client device, the method sends to the ABR OTT client device a custom manifest having a number of segmentation-units in segments that is customized for an ABR playback session. A network node, which can be one of an origin server, an edge server and a Just-In-Time Packager (JIT-P), and a computer program product for providing privacy during delivery are also shown.

15 Claims, 15 Drawing Sheets

(51) Int. Cl.
*H04N 21/2343* (2011.01)
*H04N 21/2365* (2011.01)
*H04N 21/2662* (2011.01)
*H04N 21/4408* (2011.01)
*H04N 21/8543* (2011.01)

(52) U.S. Cl.
CPC ..... *H04N 21/2662* (2013.01); *H04N 21/4408* (2013.01); *H04N 21/8456* (2013.01); *H04N 21/8543* (2013.01)

(58) Field of Classification Search
CPC ......... H04N 21/23439; H04N 21/2662; H04N 21/4408; H04N 21/8456; H04N 21/8543
See application file for complete search history.

(56) References Cited

U.S. PATENT DOCUMENTS

| | | | | |
|---|---|---|---|---|
| 2014/0013349 | A1* | 1/2014 | Millar | H04N 21/44016 |
| | | | | 725/32 |
| 2015/0009403 | A1* | 1/2015 | Li | H04N 19/40 |
| | | | | 348/441 |
| 2015/0074232 | A1* | 3/2015 | Phillips | H04N 21/2662 |
| | | | | 709/219 |
| 2015/0229471 | A1* | 8/2015 | Nair | H04L 9/0822 |
| | | | | 713/171 |
| 2016/0006836 | A1* | 1/2016 | LeFaucheur | H04L 65/80 |
| | | | | 709/203 |
| 2016/0360282 | A1 | 12/2016 | Graham et al. | |
| 2016/0366198 | A1* | 12/2016 | Jennings | H04N 21/8456 |
| 2017/0277909 | A1* | 9/2017 | Kraemer | H04N 21/4627 |
| 2018/0063213 | A1* | 3/2018 | Bevilacqua-Linn | H04N 21/2387 |
| 2018/0167436 | A1* | 6/2018 | Han | H04L 43/0888 |

OTHER PUBLICATIONS

USPTO, Office Action, U.S. Appl. No. 16/022,237, dated Sep. 3, 2019, 7pgs.

Reed et al. "Identifying HTTPS-Protected Netflix Videos in Real-Time", Dept. of Electrical Engineering and Computer Science, Mar. 23, 2017.

Pantos et al., "HTTP Live Streaming draft-pantos-http-live-streaming-23", Major League Baseball Advanced Media, May 22, 2017.

USPTO, Notice of Allowance, U.S. Appl. No. 16/022,237, dated Feb. 5, 2020, 7pgs.

* cited by examiner

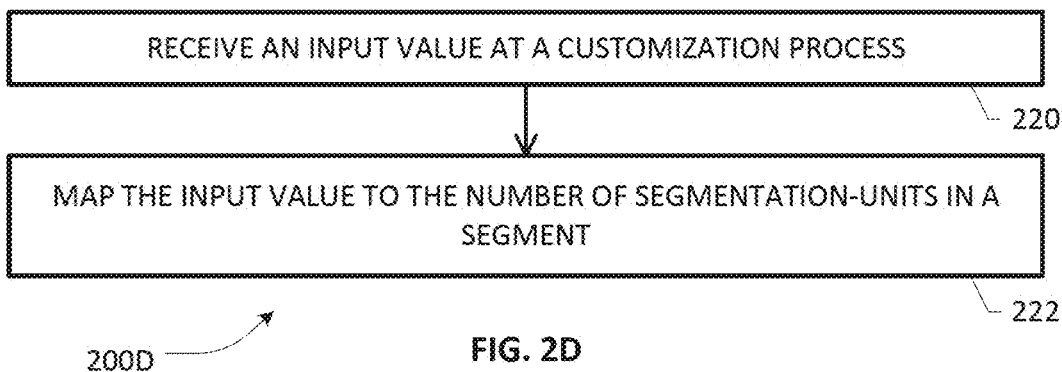
FIG. 2D
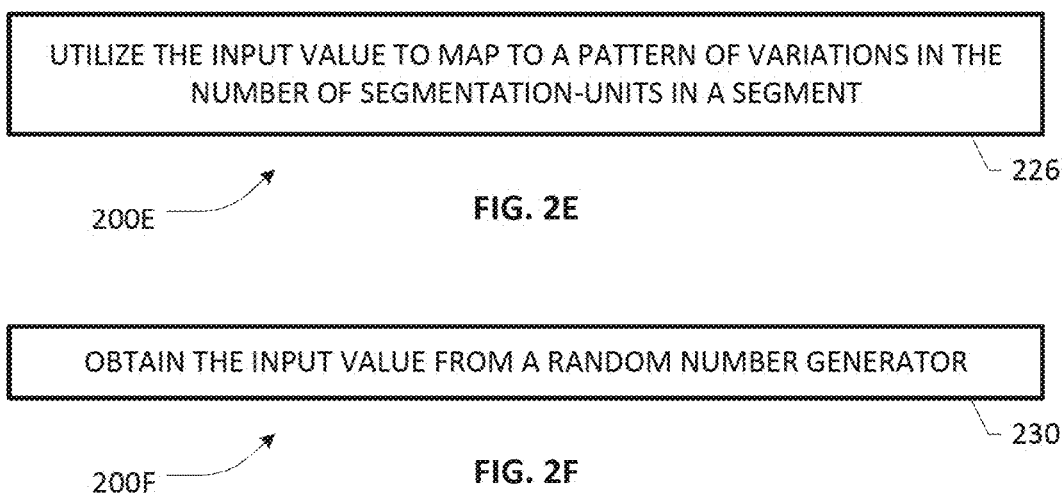
FIG. 2E
FIG. 2F
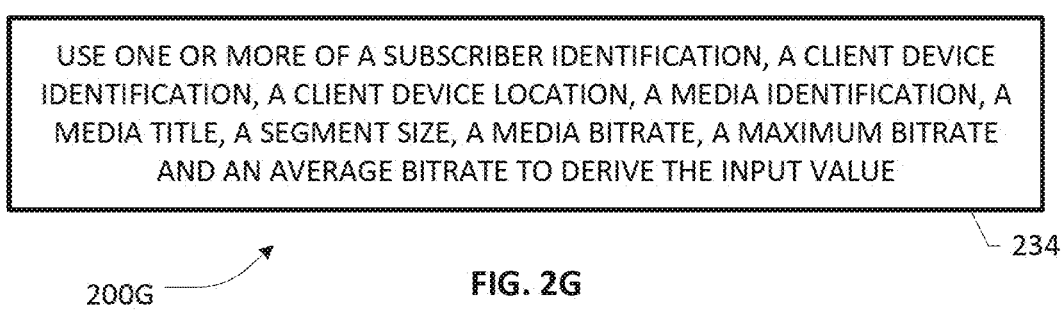
FIG. 2G
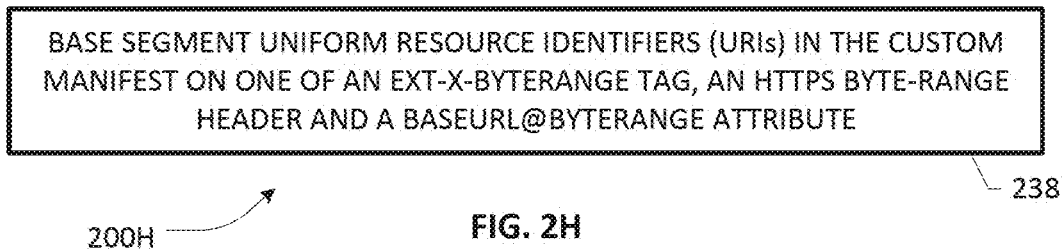
FIG. 2H

```
┌─────────────────────────────────────────────────────────────┐
│ MULTIPLEX A SET OF CONSECUTIVE RANDOMIZED BYTE-RANGE        │
│ REQUESTS FROM MULTIPLE SEGMENTS OF THE MANIFEST             │
└─────────────────────────────────────────────────────────────┘
                                                          ─ 516

500C ─→            FIG. 5C

┌─────────────────────────────────────────────────────────────┐
│ ISSUE A FIRST BYTE-RANGE REQUEST THAT OVERLAPS A SECOND     │
│ BYTE-RANGE REQUEST                                          │
└─────────────────────────────────────────────────────────────┘
                                                          ─ 518

500D ─→            FIG. 5D
```

┌─────────────────────────────────────────────────────────────┐
│ PROVIDE COMPOSITE SEGMENTS THAT EACH COMPRISE A MAIN TRACK  │
│ AND A PLURALITY OF SAMPLE VARIANT TRACKS OF AN ABR MEDIA    │
│ ASSET, THE PLURALITY OF SAMPLE VARIANT TRACKS INCLUDING     │
│ VARYING AMOUNTS OF MASKING CONTENT                          │
└─────────────────────────────────────────────────────────────┘
                                                          ─ 602
┌─────────────────────────────────────────────────────────────┐
│ ENCRYPT THE COMPOSITE SEGMENTS USING ONE OR MORE            │
│ ENCRYPTION SCHEMES                                          │
└─────────────────────────────────────────────────────────────┘
                                                          ─ 604
┌─────────────────────────────────────────────────────────────┐
│ TRANSMIT THE COMPOSITE SEGMENTS TO A CONTROLLED CACHE FOR   │
│ DELIVERY TO ABR OTT CLIENT DEVICES                          │
└─────────────────────────────────────────────────────────────┘
                                                          ─ 606

600A ─→            FIG. 6A

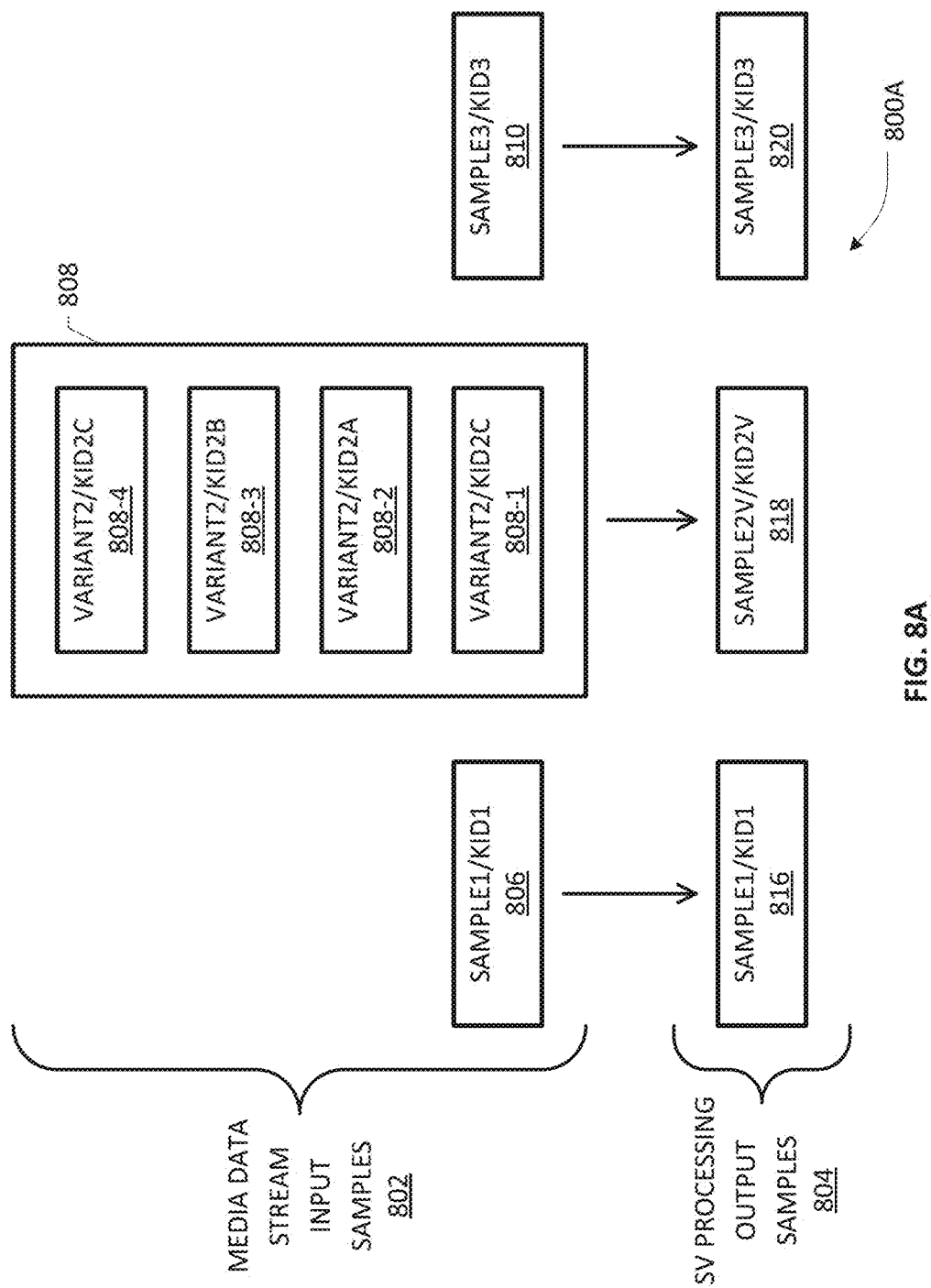

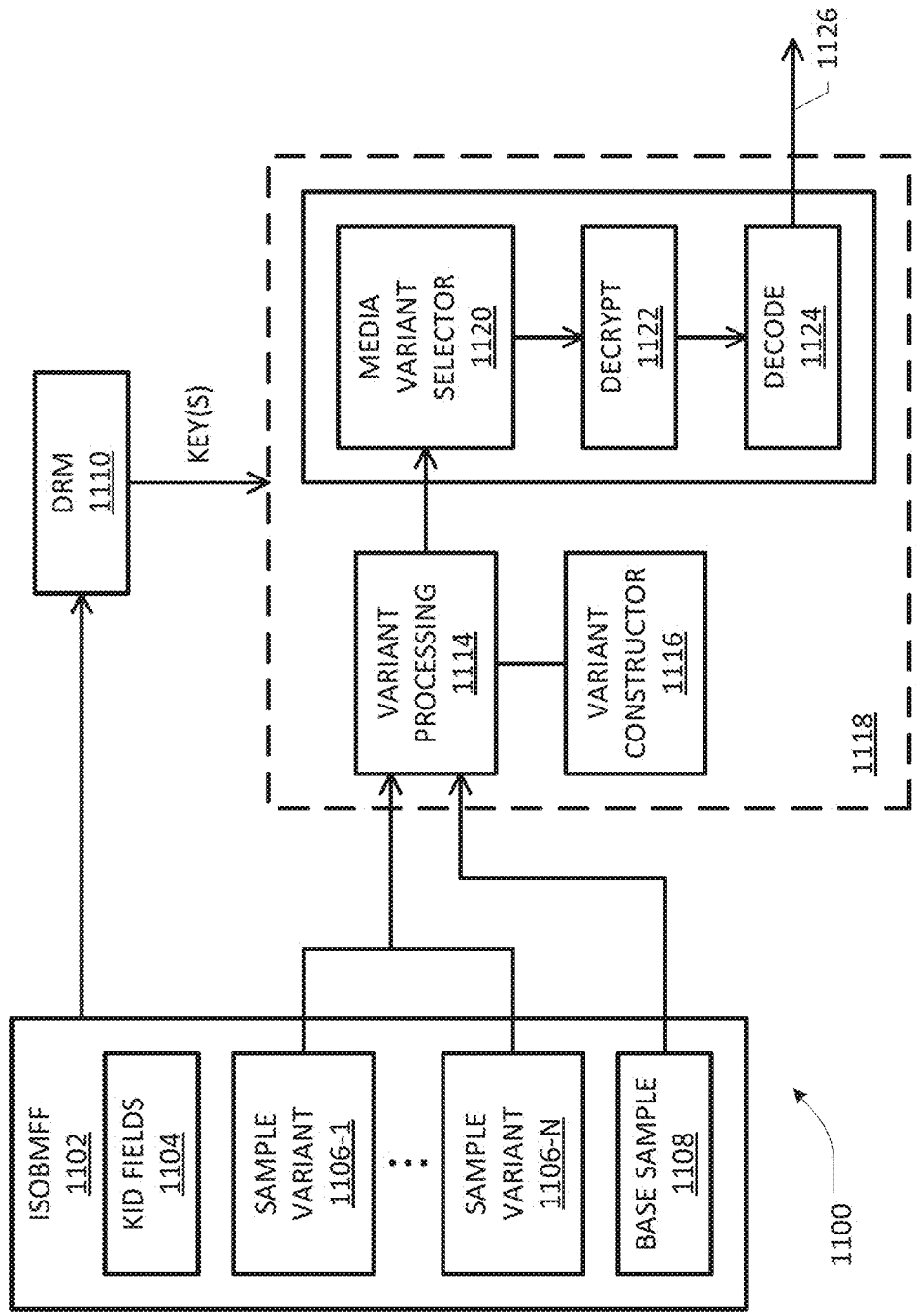

SYSTEM, DEVICES AND METHODS FOR PROVIDING STREAM PRIVACY IN AN ABR OTT MEDIA NETWORK

PRIORITY UNDER 35 U.S.C. § 120 & 37 C.F.R. § 1.78

This non-provisional application claims priority based upon the following prior United States provisional patent application entitled "SYSTEM AND METHOD FOR PROVIDING STREAM PRIVACY IN AN ABR TV/OTT MEDIA NETWORK," Application No. 62/526,146, filed Jun. 28, 2017; which is hereby incorporated by reference in its entirety.

FIELD OF THE DISCLOSURE

The present invention relates in general to communication networks. More particularly, and not by way of any limitation, the present disclosure is directed to a network architecture, system, devices, method and computer program product for providing stream privacy in an adaptive bitrate (ABR) over-the-top (OTT) media network.

BACKGROUND

Content providers have long struggled with how to provide content at a high availability and high performance to their customers in view of bandwidth limitations in content distribution networks. A content delivery/distribution network (CDN) can be a large distributed system of servers deployed in multiple data centers connected to the Internet or other public/private communications network. A CDN can be a managed or unmanaged network, and can also be a federation of managed or unmanaged networks. The goal of a CDN is to serve media content (e.g., video/audio/etc.) to user equipment nodes (UEs) with high availability and high performance. The bandwidth requirements for distributing content from content providers to central CDN servers and/or to distributed edge replication servers have grown tremendously with the proliferation of adaptive streaming content delivery solutions.

Adaptive streaming technology is being implemented to handle increasing consumer demands for streaming content, including broadcast and on-demand movies/TV, etc., across a content distribution network to UEs having widely differing performance and protocols, both in managed and unmanaged network environments. Whereas advances in the media delivery technology continue apace, issues relating to providing stream privacy remain challenging.

SUMMARY

The present patent disclosure is broadly directed to systems, methods, apparatuses, network nodes, and associated non-transitory computer-readable media for facilitating distribution of media content in a network architecture (e.g., involving managed and/or unmanaged networks) using ABR OTT media delivery, wherein stream privacy may be maintained in a variety of workflow types.

The disclosed methods for implementing stream privacy for ABR content can be broadly separated into a number of concepts, while these concepts can be applied in various combinations depending on the specific implementation. The network can provide manifests that are customized for delivery by randomizing the size of the segments being delivered to each client; the size of segments within a unicast stream to a single client can also be varied, making a determination of segment boundaries increasingly difficult. A client application or client proxy on the client device can also provide for privacy by using byte-range requests for the desired content. The client application/proxy can request content out of order and/or can request overlapping segments, then reassembles the content in order prior to presenting the content to a media player. If the content is being delivered using HTTP, which utilizes visible Uniform Resource Locators (URLs) and Uniform Resource Identifiers (URIs), both the manifest and video content can be encrypted, then the size of both the manifests and the video content can be obscured using customized comment tags in the manifests and masking content, e.g., duplicate or otherwise extraneous video data in the video stream. Techniques are also disclosed for obscuring the location of files being retrieved. Combinations of these basic techniques can be utilized to provide privacy in both visible and invisible URLs.

In one aspect, an embodiment of a method for providing privacy during delivery of adaptive bitrate (ABR) media content to a plurality of ABR OTT client devices is disclosed. The method includes receiving, at a network node that comprises one of an origin server, an edge server and a Just-In-Time Packager (JIT-P) and contains a Controlled Cache, an ABR manifest for an ABR media asset, the ABR manifest comprising a segmentation-units index that points to segmentation-units in the ABR media asset; and responsive to receiving a request for the ABR media asset from a ABR OTT client device, sending to the ABR OTT client device a custom manifest having a number of segmentation-units in segments that is customized for an ABR playback session.

In another aspect, an embodiment of a method for supporting privacy during delivery of adaptive bitrate (ABR) media content is disclosed. The method includes providing, at a packager, composite segments that each comprises a main track and a plurality of sample variant tracks of an ABR media asset, the plurality of sample variant tracks comprising varying amounts of masking content; encrypting the composite segments using one or more encryption schemes; and transmitting the composite segments to a Controlled Cache for delivery to ABR OTT client devices.

In another aspect, an embodiment of a network node operating to provide privacy in the delivery of adaptive bitrate (ABR) media content to a subscriber is disclosed. The network node includes one or more processors; an upstream interface for coupling to upstream elements; a downstream interface for coupling to downstream elements; a Controlled Cache coupled to receive and store ABR segments and corresponding ABR manifests; and one or more persistent memory modules coupled to the one or more processors and comprising instructions that, when executed by the one or more processors, perform the following at one of an origin server, an edge server and a Just-In-Time Packager (JIT-P): receiving an ABR manifest for an ABR media asset, the ABR manifest comprising a segmentation-units index that points to segmentation-units in the ABR media asset; and responsive to receiving a request for the ABR media asset from a ABR OTT client device, sending to the ABR OTT client device a custom manifest having a number of segmentation-units in segments that is customized for an ABR playback session.

In yet another aspect, an embodiment of a network packager for supporting privacy in the delivery of adaptive bitrate (ABR) media assets is disclosed. The network packager includes one or more processors; a plurality of network interfaces configured to receive media assets from one or more content sources; an encoder for generating a plurality of ABR bitrate representations to form the ABR media assets; and one or more persistent memory modules having program instructions stored thereon which, when executed by the one or more processors, perform the following: provide composite segments that each comprises a main track and a plurality of sample variant tracks of selected ABR media assets, the plurality of sample variant tracks comprising varying amounts of masking content; encrypt the composite segments using one or more encryption schemes; and transmit the composite segments to a Controlled Cache for delivery to ABR OTT client devices.

In yet another aspect, an embodiment of a non-transitory computer readable medium is disclosed. The non-transitory computer readable media has instructions stored thereon that when executed by a processor on a network node that comprises one of an origin server, an edge server and a Just-In-Time Packager (JIT-P), causes the network node to perform the following: receive an adaptive bitrate (ABR) manifest for an ABR media asset, the ABR manifest comprising a segmentation-units index that points to segmentation-units in the ABR media asset; and responsive to receiving a request for the ABR media asset from a ABR OTT client device, sending to the ABR OTT client device a custom manifest having a number of segmentation-units in segments that is customized for an ABR playback session.

In yet another aspect, an embodiment of a non-transitory computer readable medium is disclosed. The non-transitory computer readable medium has instructions stored thereon that when executed by a processor at a packager causes the packager to perform the following: provide composite segments that each comprises a main track and a plurality of sample variant tracks of an adaptive bitrate (ABR) media asset, a sample variant track of the plurality of sample variant tracks comprising masking content; encrypt the composite segments using one or more encryption schemes; and transmit the composite segments to a Controlled Cache for delivery to ABR OTT client devices.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIGS. 2B-2H depict various blocks, steps and/or acts that may be combined with the elements of FIG. 2A for facilitating network-provided stream privacy in the distribution and delivery of ABR OTT VOD media according to an embodiment;

FIGS. 5A-5D are flowcharts of various blocks, steps and/or acts that may be combined in one or more arrangements, with or without additional flowcharts of the present disclosure, for facilitating client-provided stream privacy in the distribution and delivery of ABR OTT VOD according to an embodiment;

FIGS. 6A-6C are flowcharts of various blocks, steps and/or acts that may be combined in one or more arrangements, with or without additional flowcharts of the present disclosure, for facilitating the distribution and delivery of ABR OTT VOD content according to an embodiment;

FIGS. 8A and 8B depict example sample variant processing schemes that may be used and/or modified in an example embodiment for facilitating transmission of media with one or more encryption schemes and/or payloads of masking content according to an embodiment of the present invention;

FIG. 11 depict an example sample variant processing scheme for facilitating transmission of media with one or more encryption schemes according to an embodiment of the present invention.

DETAILED DESCRIPTION OF THE DRAWINGS

Figure 1:
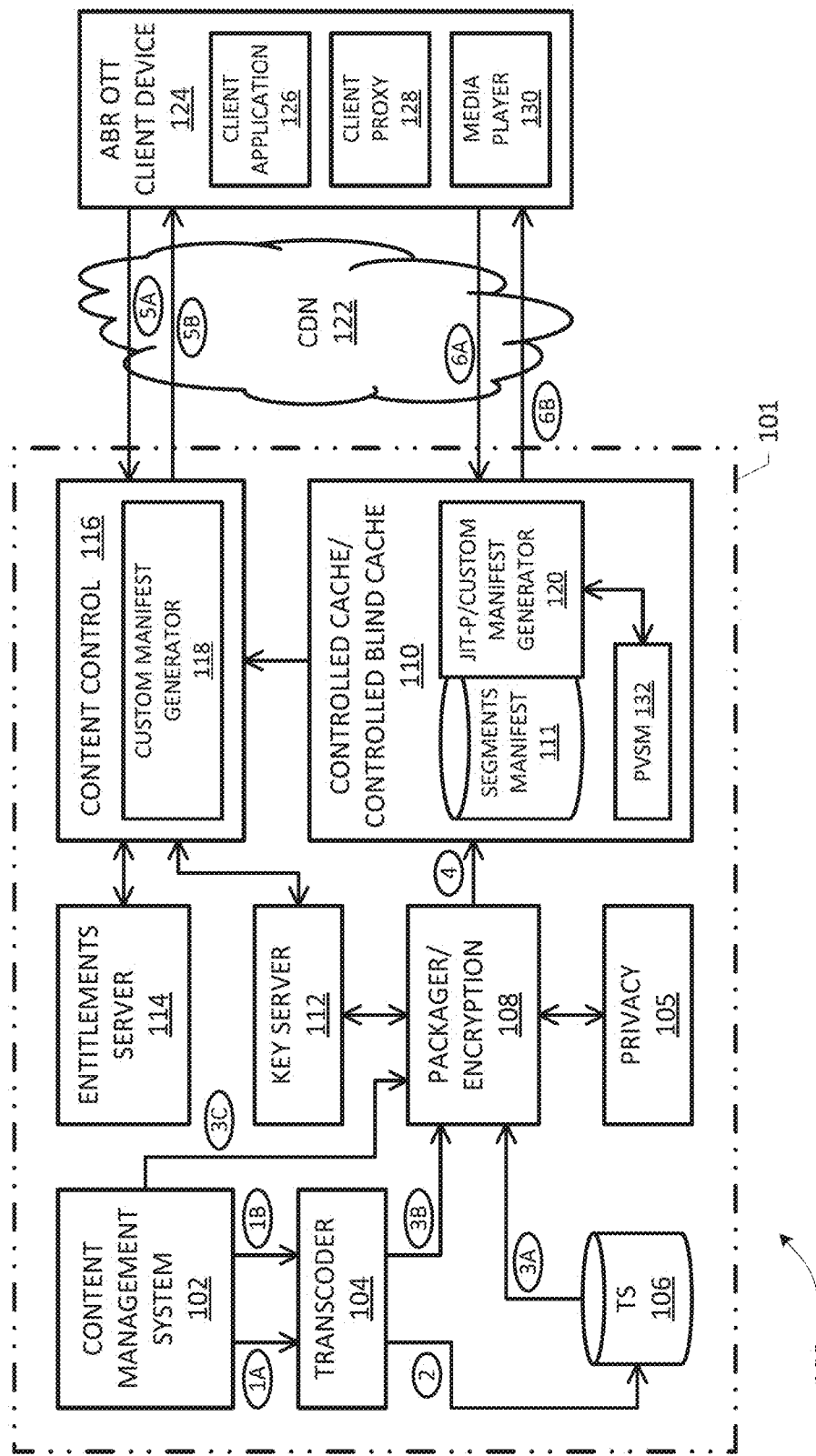
FIG. 1 depicts a generalized example network architecture for facilitating stream privacy in the distribution and delivery of ABR OTT Video On Demand (VOD) according to one or more embodiments of the present patent application.
Figure 2A:
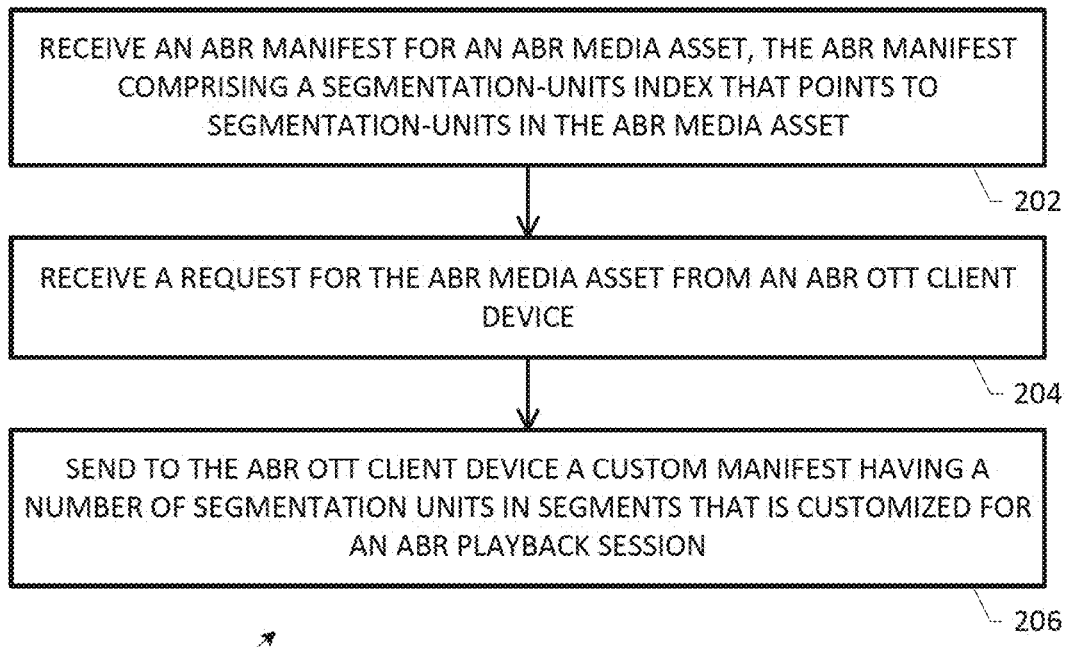
FIG. 2A is an overall flowchart of various blocks, steps and/or acts that may be (re)combined in one or more arrangements, with or without additional flowcharts of the present disclosure, for facilitating stream privacy in the distribution and delivery of ABR OTT VOD media according to an embodiment.
Figure 2B:
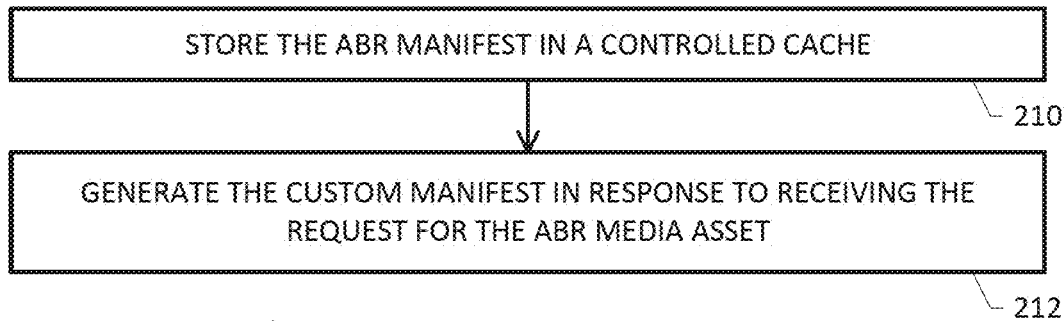
Figure 2C:
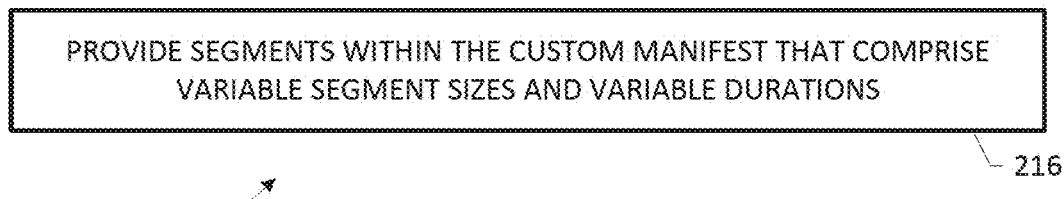

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged or programmed under suitable executable code to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers and associated user equipment that are operative to receive/consume content in a media streaming network where media content assets may be distributed and delivered using stream-based or file-based mechanisms. As such, some network elements may be disposed in a wireless radio network environment whereas other network elements may be disposed in a public packet-switched network infrastructure, including or otherwise involving suitable content delivery network (CDN) infrastructure. In still further arrangements, one or more network elements may be disposed in a cloud-based platform or datacenter having suitable equipment running virtualized functions or applications. Further, suitable network elements including one or more embodiments set forth herein may involve terrestrial and/or satellite broadband delivery infrastructures, e.g., a Digital Subscriber Line (DSL) network architecture, a Data Over Cable Service Interface Specification (DOCSIS)-compliant Cable Modem Termination System (CMTS) architecture, switched digital video (SDV) network architecture, a Hybrid Fiber-Coaxial (HFC) network architecture, a suitable satellite access network architecture or a broadband wireless access network architecture over cellular and/or WiFi connectivity. Accordingly, at least some network elements may comprise "multiple services network elements" that provide support for multiple network-based functions (e.g., A/V media management, session control, Quality of Service (QoS) policy enforcement, bandwidth scheduling management, subscriber/device policy and profile management, content provider priority policy management, streaming policy management, network storage policy management, and the like), in addition to providing support for multiple application services (e.g., data and multimedia applications). Subscriber end stations, client devices or customer premises equipment (CPE) may comprise any device configured to execute, inter alia, a streaming client application and/or an HTTP download application for receiving live/stored media content from one or more content providers, e.g., via a suitable access network or edge network arrangement based on a variety of access technologies, standards and protocols. For purposes of one or more embodiments of the present invention, an example client device may also comprise a hardware platform for running networked or local gaming engines and related applications for effectuating virtual reality environments in a subscriber premises. Such client devices and/or CPE hardware platforms may therefore include portable laptops, netbooks, palm tops, tablets, mobile phones, smartphones, multimedia/video phones, mobile/wireless user equipment, portable media players, portable gaming systems or consoles (such as the Wii®, Play Station 3®, etc.) and the like that may access or consume live media content/services, stored content services or video on demand services, time-shifted and/or place-shifted content services, etc. provided over a delivery network or a combination of networks for purposes of one or more embodiments set forth herein. Further, the client devices may also access or consume content/services provided over broadcast networks (e.g., cable and satellite networks) as well as a packet-switched wide area public network such as the Internet via suitable service provider access networks. In a still further variation, the client devices or subscriber end stations may also access or consume content/services provided on virtual private networks (VPNs) overlaid on (e.g., tunneled through) the Internet.

One or more embodiments of the present patent disclosure may be implemented using different combinations of software, firmware, and/or hardware in one or more modules suitably programmed and/or configured. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

The collection of personal information from multiple sources continues to increase, as has the desire to protect individual privacy for streaming content. Several recent studies have shown that even when video content is sent under HTTPS or other protected protocols, certain advantageous encoding techniques, e.g., variable bitrate (VBR) encoding, increase the vulnerability of a video stream to snooping by a third party, e.g., by creating a "fingerprint" for a video. In particular, Reed, A. & Kranch, M., "Identifying HTTPS-Protected Netflix Videos in Real-Time", *CODASPY* 17, Mar. 22-24, 2017, Scottsdale, Ariz., USA demonstrates that video that is encoded with VBR provides an identifiable fingerprint, even when the video is delivered using encrypted transport such as HTTPS. A fingerprint for each video in a collection of videos can be created by an automated crawler. Once a database of fingerprints is created, the content being delivered to a client can be identified in real time utilizing metadata cataloged by the crawlers. Such reports can dampen the enthusiasm for the use of HTTPS. The techniques disclosed herein provide for the customized delivery of video to client devices such that the video is no longer identifiable on the basis of a fingerprint. ABR OTT service providers need to protect the privacy of their viewers and need to protect the identification of the OTT ABR content viewed on client devices. The solution should provide the following:

- Protection from fingerprinting software and entities;
- Protection from software and/or entities that leak the identity of the ABR content being watched;
- Use of content with VBR encoding without the loss of identity;
- Protection from loss of content identity when content is served using HTTP where the URLs are visible;
- Protection from loss of content identity when encrypted content is delivered using HTTPS or QUIC and the URLs are invisible;
- Prevent uncontrolled caches from caching the ABR Segments; and
- Enable Controlled Caches to cache the ABR Segments while preventing uncontrolled caches from being able to cache the content.

Existing workflows for ABR OTT services where encrypted content is delivered using HTTP having visible URLs do not protect the privacy of the ABR OTT service user, leading to a loss of content identity, easy caching by uncontrolled caches and loss of privacy for the viewer. Existing ABR OTT privacy service solutions try to provide content identity privacy using one or more of the following workflows:

- Content is delivered with encrypted segments and manifests using HTTPS (invisible URL) to protect the privacy of the viewers;
- Content is delivered with encrypted HTTP headers;
- Content is served from blind caches from CDN or service provider network;
- Blind caches may be controlled by the content provider or CDN/service provider.

Existing ABR OTT content playback workflows suffer from leaked identity in the following ways:

- Easy identification of content/video watched and associated metadata using fingerprinting techniques;
- Content fingerprinting database created by crawlers;
- Content/Video delivered is identified in real time by using segment size of the video segments, especially with VBR, and other metadata that are identified and cataloged as part of building the fingerprinting database;
- Fingerprinting methods use ADUDUMP and analysis software that allows the delineation of segment boundaries and helps fingerprinting software to create fingerprints for VBR encoded content/media.

Referring now to the drawings and more particularly to FIG. 1, depicted therein is generalized example network architecture for facilitating stream privacy in the distribution and delivery of ABR VOD. It will be recognized that whereas "distribution" may be generally used to describe the provisioning of media within a core/distribution network and out to one or more edge servers, "delivery" of the media takes place between the edge server and the client, although such terms may be somewhat interchangeably used in the context of one or more embodiments of the present application. In general, the terms "media content," "digital asset", "media asset", "content file", "media segments", or terms of similar import (or, simply "content") as used in reference to at least some embodiments of the present patent disclosure may include digital assets or program assets such as any type of audio/video (A/V) content that may comprise live capture media or static/stored on-demand media, e.g., over-the-air free network television (TV) shows or programs, pay TV broadcast programs via cable networks or satellite networks, free-to-air satellite TV shows, IPTV programs, Over-The-Top (OTT) and Video-On-Demand (VOD) or Movie-On-Demand (MOD) shows or programs, time-shifted TV (TSTV) content, Catch-up service content, Virtual Reality (VR) content, Augmented Reality (AR) content, ABR content, etc. ABR media assets, as used in the context of one or more embodiments of the present application, include media assets that have been segmented into a collection of segments of different bitrates that can be requested by an ABR client device. In at least some embodiments, ABR media assets contain segments that are composite segments, i.e., which include a main track and one or more sample variant tracks.

In the context of the present disclosure, an embodiment of the communications network 100 for the distribution and delivery of ABR TV and OTT media may implemented as an end-to-end network architecture for delivering ABR media content (and advertisement content, where applicable) using any delivery infrastructures, e.g., a Digital Subscriber Line (DSL) architecture, a Data Over Cable Service Interface Specification (DOCSIS)-compliant Cable Modem Termination System (CMTS) architecture, a suitable satellite access architecture or a broadband wireless access architecture. By way of example and introduction, an ABR streaming delivery is broadly set forth herein that is applicable to DSL architectures without necessarily being limited thereto.

As will be seen below, content may be delivered using either multicast ABR techniques or unicast ABR techniques. In a unicast delivery, a subscribing receiver may be provided with a direct and unique two-way path through the delivery network all the way back to a serving media server supplying the required data stream. The main streaming activity is managed on a one-to-one basis between the receiver and the source server in a communication session. The network between the source server and receiver may typically comprise a series of intermediate servers installed at network nodes, which may not be directly involved in the service but only support the transfer of a packet stream. Typically, the protocols used to support the transmissions are simple forms of Internet Protocol (IP) itself augmented by one or more higher-layer protocols to provide flow control. These protocols extend across the span of the network connection between the source server and a given receiver.

A unicast ABR system allows some form of rate adaptation. A given service may be encoded at a selection of different bitrates (known as representations), with synchronised boundary points at defined locations (e.g., every 50 frames). For each representation, content between successive boundary points is converted into a discrete file. Clients fetch a segment of one of the representations in turn. If a higher or a lower bit rate is required, the next segment is fetched from one of the other representations. The segments are constructed such that there is no discontinuity in decoded pictures/audio if the client switches between representations at the boundary points. This system may require a unicast two-way path between source and receiver to request files and deliver the requested files.

Multicast ABR (MABR) delivery makes more efficient use of bandwidth by sharing content streams among several receivers, with each representation of a stream provided separately. Intermediate network elements (e.g., routers or switches) are now more closely involved in the service delivery such that some control and management functions are delegated from the source server. This control is supported by more extensive protocols devised for this type of application such as, e.g., Protocol Independent Multicast (PIM) and Internet Group Multicast Protocol (IGMP). When a receiver requests a given media asset, the network router system finds an existing stream of that content already in the network and directs a copy of it to that receiver from a serving cable headend, a video head office or an appropriately proximal network node in an edge distribution network. The requesting receiver may be provided with the capability to join this existing stream under controlled conditions that do not adversely affect existing receivers. Any receiver in this group may also be provided with the ability to pause its consumption, or leave the stream, e.g., to join a different channel or a different representation of the same channel, without affecting the others. Additionally, there may be an implementation where a video pipe delivering services to a premises is operative to deliver content to one or more progressive download clients of the premises that are designed to receive the video in bursts.

By way of illustration, content management system 102 of content provider network 101 provides static/on-demand media assets such as video on demand services, cloud/network digital video recorder (nDVR) content sources, etc., on stream 1A, live content sources on stream 1B and other sources of ABR media containing segments and manifests on stream 3C; accordingly content provider network 101 provides generalized content sources with respect to streaming media to a broad array of client devices, of which representative ABR OTT client device 124 is shown. ABR OTT client device 124 contains a client application 126, client proxy 128 and media player 130. ABR OTT client device 124 is representative of any type of media-consuming device having suitable client application(s), media player(s), decoder/decrypt module(s), and optionally variant extractor functionalities, as noted elsewhere in the present patent application. By way of illustration, client application 126 may include an IOS/Android application, a browser application, Apple TV application, OTT-STB application and Chromecast application, etc.

Media content assets from the content sources that are not already in ABR format, e.g. as shown at streams 1A and 1B, may be processed, encoded/transcoded and/or prepared by transcoder 104. Transcoder 104 can provide live multicast ABR (MABR) media directly to packager/encryption node 108 via stream 3B. Both static media assets and live MABR that is being time-shifted can be sent as VOD MBR over stream 2A to TS storage 106 and then provided to packager/encryption node 108 as stream 3A at an appropriate time. Packager/encryption node 108 may also receive ABR segments and manifests on stream 3C for re-packaging and/or encryption. Packager/encryption node 108 in conjunction with key server 112 provides encrypted ABR and MABR media via stream 4 for transmission over content provider network 101 to a Controlled Cache 110, which in some embodiments is a Controlled Blind Cache; the contents of Controlled Cache 110 remain under the control of the content provider network. Encrypted segments and manifests are stored in non-transitory storage 111 at Controlled Cache 110 and manifest can also be forwarded to content control node 116. Controlled Cache 110 also contains custom manifest generator 120 that may operate in conjunction with a privacy session manager (PVSM) node 132 to generate custom manifests and customized segments that contain masking content that has been customized for the ABR OTT client device. Content control node 116 may also include custom manifest generator 118 and an associated PVSM node (not specifically shown). Controlled Cache 110 can be provided in conjunction with any of an origin server, an edge server and a Just-In-Time Packager (JIT-P) (none of which are specifically shown). Content control node 116 can receive requests for manifests over stream 5A and provide the manifests over stream 5B. Controlled Cache 110 can receive requests for both manifests and segments over stream 6A and provide the manifests and segments over stream 6B.

Controlled Cache 110 is considered to be a Controlled Blind Cache when Controlled Cache 110 is operable to deliver ABR media using HyperText Transfer Protocol Secure (HTTPS) or Quick UDP Internet Connections (QUIC). Controlled Cache 110 operates using one or more of the cloaking techniques disclosed herein and can provide manifests and media segments that are customized for each request from an ABR OTT client device utilizing a customization process (not specifically shown) that determines a segment size to be utilized to provide the media content asset to the individual client device. Each ABR OTT client device can be sent a custom manifest and media having a customized segment size, so that the fingerprint of a media content asset changes each time the content media asset is sent to an ABR OTT client device. Although specific implementations may differ, the goal in providing custom manifests and customized segment size is to provide a unique manifest and unique segmentation to each requesting ABR OTT client device. While the goal of a unique manifest and unique segmentation of content for each ABR OTT client device may not necessarily be met in every instance, the disclosed customization is capable of providing a level of difference between multiple streams of the same media so as to make determining the content carried in the stream exponentially more difficult if not impossible.

In implementations utilizing HTTP, Controlled Cache 110 further controls the privacy of the media stored at or transmitted from Controlled Cache 110 by providing customized masking content, e.g., fake bytes, in the media segments and customized comment tags in the manifests in order to obscure the actual size of the content asset being sent to a ABR OTT client device. In this embodiment, packager/encryption node 108 operates in conjunction with privacy node 105, which facilitates generation of a plurality of elementary streams (ES) having different payloads of masking content for an ABR media asset. When an ABR OTT client device requests a media content asset, one or more of the sample variant tracks is selected to be included with the main track to provide a customized stream that is not recognizable, even if web crawlers have cataloged the contents of the Controlled Cache 110. In at least some embodiments where ABR media assets are being provided to an ABR OTT client device, client proxy 128 or client application 126 is able to provide further cloaking functionality by requesting segments that are out of order or that provide overlapping portions of the ABR media asset. Prior to passing the ABR media asset to media player 130, client proxy 128 or client application 126 ensures that the ABR media asset is in proper order. In the present application, reference is generally made to client proxy 128 as performing specific actions; however, it will be understood that these actions can be incorporated into client application 126 where a client proxy is not utilized.

Although not specifically shown in FIG. 1, various types of edge networks and access networks may be interfaced between client devices and upstream network elements in the respective network infrastructures for facilitating media delivery over wired and/or wireless technologies, including without limitation, e.g., LTE/5G/Next Generation Network (NGN) technology, etc.

Content management system 102 may be configured to accept media content from live sources and/or static file sources, e.g., online content providers such as Hulu®, Netflix®, YouTube®, or Amazon® Prime, as well as VOD catalog or content providers or studios such as, e.g., Disney, Warner, Sony, etc. Media content from live sources may comprise live programming captured relative to any type of event, e.g., sporting/entertainment/gaming events, concerts, live TV shows, live news broadcasting sources, such as, for instance, national broadcasters (e.g., NBC, ABC, etc.) as well as cable broadcaster channels like Time Warner channels of CNN, ESPN, CNBC, etc., and local broadcasters, etc. In general operation, an example transcoder 104 may be configured, under the control of one or more processors executing appropriate program code stored in a persistent memory module, to effectuate media preparation as follows. Initially, source media content is transcoded or otherwise encoded with different bit rates (e.g., multi-rate transcoding) using applicable encoder(s). For example, content of a particular media content asset or program may be transcoded into five video files using variable bit rates (or, synonymously "bitrates" or "resolutions"), ranging from low to high bit rates (500 Kbps to 10 Mbps, by way of illustration). The particular content is therefore encoded as five different "versions", wherein each bitrate is called a profile or representation. A segmentation server or segmenter (not specifically shown) is operative to divide each version of the encoded media content into fixed duration segments or chunks, which are typically between two and ten seconds in duration, thereby generating a plurality of chunk streams and/or virtual segmented streams depending on implementation. One skilled in the art will recognize that shorter segments may reduce coding efficiency whereas larger segments may impact the adaptability to changes in network throughput and/or fast changing client behavior. Regardless of the chunk size, the segments may be Group-of-Pictures (GOP)-aligned in an embodiment such that all encoding profiles have the same segments. In one embodiment, packager/encryption node 108 may be configured to containerize the media segments and/or adaptive TS streams (ATS) with virtual segmentation information to mark the segment boundaries (i.e., ATS virtual segmented media stream) into a composite segment format (e.g., suitable for file-based distribution, stream-based distribution, or both to the edge nodes).

When ABR OTT client device 124 requests a manifest for an ABR media asset, CDN 122 forwards the request to either Controlled Cache 110 or to content control node 116 to which manifests for the ABR media asset have been previously provided. Content control node 116 communicates with entitlements server 114 and with key server 112 for verification of the ABR OTT client device's entitlements to the requested ABR media asset. Depending on where the request for the manifest was sent, either custom manifest generator 118 at content control node 116 or custom manifest generator 120 at Controlled Cache 110 customizes a manifest for the requested ABR media asset, as will be explained in greater detail below, and provides the custom manifest for delivery to ABR OTT client device 124. In at least one embodiment, custom manifest generator 118/120 utilizes a customization process (not specifically shown) and a segmentation-units index (not specifically shown) provided in the received manifest to select a size of segments to send to ABR OTT client device 124. The segmentation-units index contains a pointer to the location of each I-frame in the ABR media asset. Accordingly, regardless of the segment size provided at packager/encryption node 108, custom manifest generator 118/120 is able to create a custom manifest that references customized segments, whose locations are indicated in the segmentation-units index. In addition to providing a customized segment size for ABR OTT client devices, the customization process can further include the use of variable segment sizes and variable segment durations within a single manifest. In one embodiment, a pattern of variations to utilize in customizing the segment sizes in a custom manifest can be determined by the customization process.

Using the custom manifest, ABR OTT client device 124 requests segments of the requested ABR media asset that differ in size and duration from the segments downloaded by other ABR OTT client devices requesting the same ABR media asset. In at least one embodiment, the customization process utilizes one or more of random number provided by a random number generator, a subscriber identification, a client device identification, a client device location, a media identification, a media title, a segment size, a media bitrate, a maximum bitrate and an average bitrate to determine a size of segment to be sent to ABR OTT client device 124. In at least one embodiment, the requested manifest is delivered via HTTP and the manifest is further customized by including a random group of comment tags in the manifest that mask the size and fingerprint of the provided manifest. In at least some embodiments, the manifest is encrypted.

Once a custom manifest has been delivered to ABR OTT client device 124, client proxy 128 of ABR OTT client device 124 begins requesting segments utilizing the custom manifest. In at least one embodiment, client proxy 128 is further operable to request segments of the ABR media asset that are out of order and/or that overlap other segments requested by client proxy. A separate customization process (not specifically shown) operating in conjunction with client proxy 128 is utilized to make byte-range requests that are randomized, while taking into account applicable time periods, e.g. when specific segments are available to ABR OTT client device 124 and/or when the specific segments are needed for presentation to the user. In at least one embodiment, client proxy 128 can multiplex requests from different segments in the custom manifest. Segments are delivered from Controlled Cache 110, which can be a Controlled Blind Cache.

In one embodiment, a suitable distribution container such as an ISO Base Media File Format (ISOBMFF)-based container, e.g., Common Media Application Format (CMAF), is utilized for facilitating the provision of privacy in the delivery of streaming content to one or more ABR OTT client devices 124, although other formats for file-based or stream-based distribution may also be used in additional and/or alternative embodiments according to the teachings herein. In a still further variation, a common mezzanine distribution format or CMZF may be provided for facilitating privacy in the distribution of media contents, wherein a single intermediary distribution container structure, referred to herein as CMZF container structure, may be provided based on an MPEG Transport Stream (MPEG-TS) container format extended to include a modified Program-Specific Information (PSI) metadata structure configured to add extra elementary stream (ES) definitions corresponding to carriage of various stream types. Media content that is provided using the CMZF container format can be encrypted at the packager and can be sent throughout the network to client devices without the need to decrypt or re-encrypt the media at any point. Additional information relating to CMZF-based distribution may be found in the following commonly owned patent application(s): (i) "SYSTEM AND METHOD FOR MEDIA DELIVERY USING COMMON MEZZANINE DISTRIBUTION FORMAT", application Ser. No. 15/378,734, filed Dec. 14, 2016 (hereinafter referred to as the "CMZF patent application"), each of which is incorporated by reference herein.

As mentioned previously, stream cloaking for stream privacy can take at least three forms, depending on the specific circumstances and implementations: 1) network stream cloaking, performed primarily by the Controlled Cache and content controller, with support in at least one embodiment from a packager, e.g., packager/encryption node 108, 2) client stream cloaking, performed by either a client proxy or client application and 3) cloaking of content and manifest under HTTP. Each of these stream cloaking strategies will be discussed in greater detail, followed by a discussion of specific combinations of these strategies that can be employed.

Network Stream Cloaking for Stream Privacy

Turning now to FIGS. 2A-2H, depicted therein are flowcharts of various steps, blocks and/or acts that may be combined or arranged into one or more embodiments, with or without blocks from other flowcharts, for facilitating stream privacy in the delivery of ABR media in the example network architecture of FIG. 1. Broadly, an embodiment of network stream cloaking for providing stream privacy is set forth in method 200A, which may involve the following. A network node that comprises a Controlled Cache receives (202) an ABR manifest for an ABR media asset. The network node can be an origin server, an edge server or a JIT-P node. As is known in the art, the ABR manifest includes a segmentation-units index, which points to segmentation-units in the ABR media asset.

Applicants have defined a segmentation-unit as the smallest duration of media such as audio or video that can be used to generate an ABR segment. For video segments this is typically a video having the duration of a Group of Pictures. In at least one implementation, a segmentation-unit can be smaller in duration than a GOP, e.g., for fragmented MP4, a segmentation-unit may be a single MOOF. Each ABR segment that is provided for a media asset is a concatenation of segmentation-units, with the manner in which a specific media asset is segmented determined by a segmenter module as part of media preparation. The segments within an ABR media asset are generally formed from the same number of segmentation-units, although a segment that lies at a boundary point, e.g., between a portion of a movie and an advertisement, may have a different number of segmentation-units. Note that in at least some embodiments, both segments and segmentation-units can be composite segments/segmentation-units that contain a main track and one or more sample variant tracks. In at least one embodiment, the segments are encrypted with a CENC protection scheme, which is discussed in detail in the section on stream cloaking under HTTP. Manifests can also be encrypted.

Figure 3:
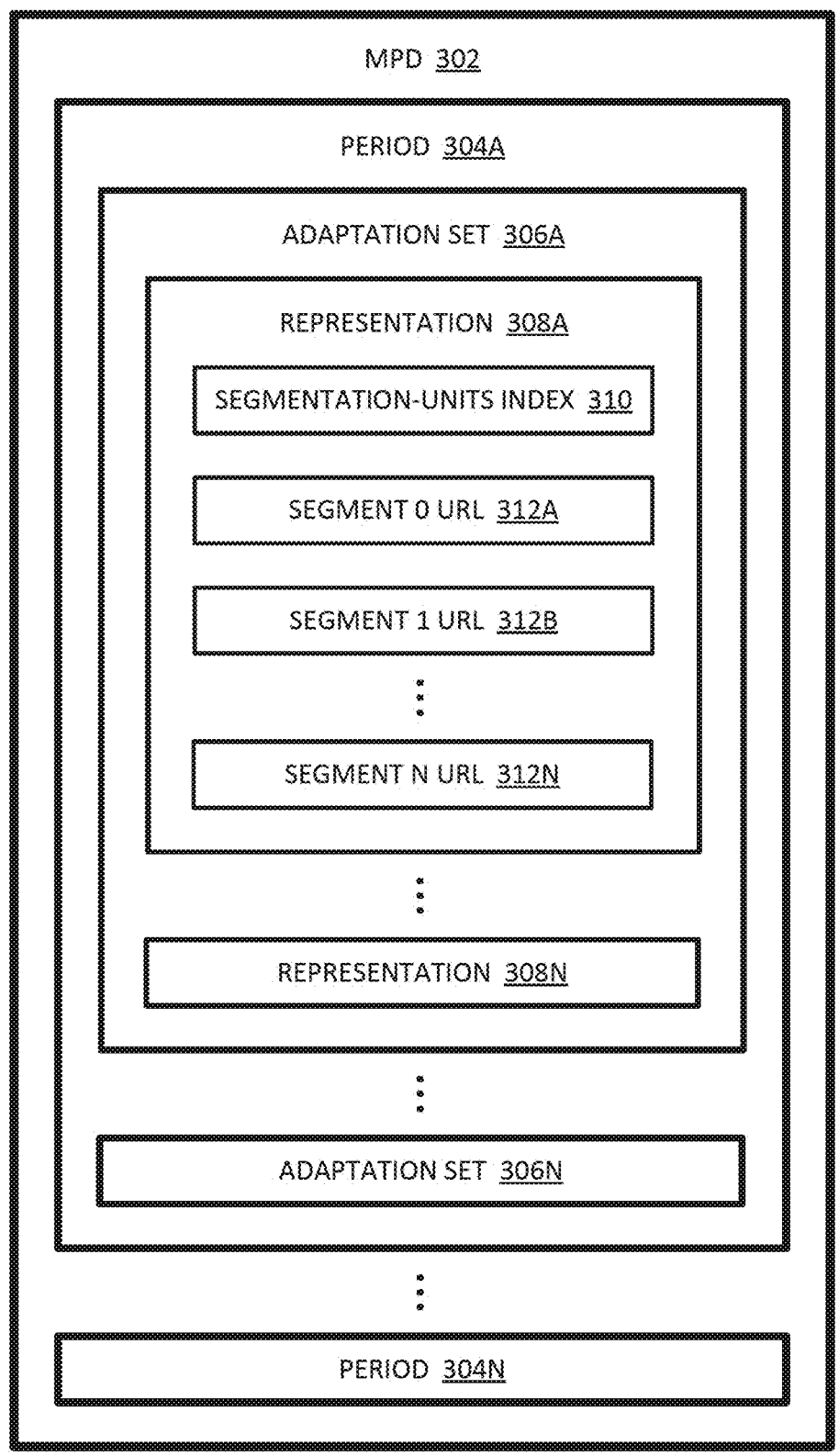
FIG. 3 depicts an example MPEG-DASH Media Presentation Description (MPD) that includes a segment index for use in an embodiment of the present patent application.

FIG. 3 depicts an example manifest 300, which in the specific embodiment shown is an MPEG-DASH Media Presentation Description (MPD) 302, although other formats can also be utilized, e.g., for Apple HLS. MPD 302 includes a number of periods 304A-304N, each of which represents a time sequence of media presentation such that all representations in one period share a common presentation timeline. Period 304A is expanded to illustrate adaptation sets 306A-306N, of which only the first and last adaptation sets are shown. Adaptation sets enable the grouping of different multimedia components, e.g., audio and video, which logically belong together. For example, components with the same codec, language, resolution, audio channel format (e.g., 5.1, stereo) etc. can be within the same adaptation set, which allows the client to eliminate a range of multimedia components that do not fulfill the client's requirements.

Adaptation set 306A is expanded to illustrate representations 308A-308N, which contain interchangeable versions of the respective content, e.g., different resolutions, bitrates etc. The use of multiple representations allows clients to adapt the media stream to the current network conditions and bandwidth requirements in order to guarantee smooth playback. Representations are chopped into segments that are described by a URL and in certain cases by an additional byte range if those segments are stored in a large, continuous file. The use of segments enables switching between individual representations during playback and provides the ability for the ABR OTT client device to optimize the bitrate to fit network conditions. Segments may also have an availability time signaled as wall-clock time from which they are accessible for live streaming scenarios. Representation 308A includes segment URL 312A that points to the location of a first segment, segment URL 312B that points to the location of a second segment, and segment URL 312N that points to the location of an Nth segment. Representation 308A also contains a segmentation-units index 310, which provides an index to the location of each of the segments 312.

Figure 4:
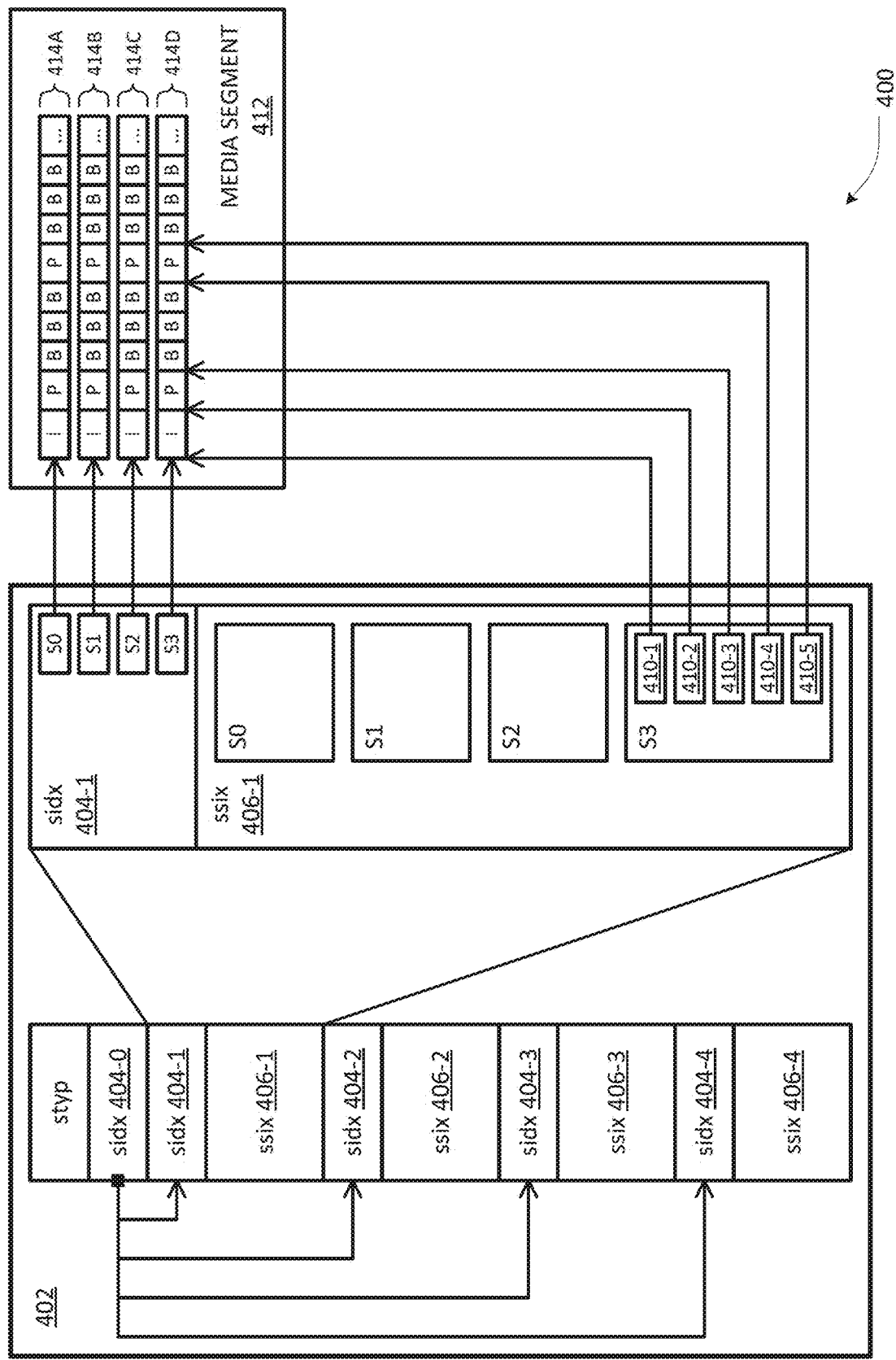
FIG. 4 depicts a segment index (SIDX) and subsystem index (SSIX) and their relationship to media segments according to an embodiment of the present invention.

FIG. 4 depicts an example of a portion of a system 400 having a segmentation-units index, such as segmentation-units index 310, and media segments, of which media segment 412 is shown. Media segment 412 contains four segmentation-units 414, each comprising a GOP that contains a single I-frame and multiple P-frames, each P-frame followed by multiple B-frames. In the embodiment shown, segmentation-units index 402 includes segment index (SIDX) boxes 404-0 through 404-4 and sub-segment index (SSIX) boxes 406-1 through 406-4. The initial SIDX box 404-0 contains pointers to each of the remaining SIDX boxes 404-1 through 404-4. SIDX box 404-1 and SSIX box 406-1 are expanded to depict the contents of these boxes. In SIDX 404-1, pointers S0 through S3 point to the locations of each of the segmentation-units 414 in media segment 412. More specifically, pointer S0 points to the location of segmentation-unit 414A; pointer S1 points to the location of segmentation-unit 414B; pointer S2 points to the location of segmentation-unit 414C; and pointer S3 points to the location of segmentation-unit 414D. Similarly in sub-sector index SSIX 406-4, a first pointer 410-1 points to the location of the I-frame that begins segmentation-unit 414D; a second pointer 410-2 points to the location of a first P-frame in segmentation-unit 414D; a third pointer 410-3 points to the location of a first B-frame following the first P-frame in segmentation-unit 414D; a fourth pointer 410-4 points to the location of a second P-frame in segmentation-unit 414D; and a fifth pointer 410-5 points to the location of a first B-frame following the second P-frame in segmentation-unit 414D.

Utilizing a segmentation-unit index such as the one shown in FIG. 4, a custom manifest generator, e.g., custom manifest generator 118/120, can utilize segmentation-units to create ABR segments having durations different than those in the manifest provided by the packager. It will be recognized that a network node containing a Controlled Cache or Controlled Blind Cache that receives a manifest from the packager can either send out the received manifest unaltered or else perform customization on the ABR manifest to provide the ABR OTT client device with a custom manifest. During the customization process, the custom manifest generator can vary the number of segmentation-units provided in each segment, which will change the number of segments provided for the ABR media asset. In at least one embodiment, the number of segmentation-units provided in a segment can vary within a single custom manifest.

Returning to FIG. 2A, the network node receives (204) a request for the ABR media asset from an ABR OTT client device. While the request from the ABR OTT client device may be received directly from the ABR OTT client device, the request may also have been forwarded to the network node, e.g., by CDN 122. The network node sends (206) a custom manifest that has a number of segmentation-units in the media segments that is customized for an ABR playback session in the manner disclosed herein. Although in some instances the ABR OTT client device may be sent the ABR manifest, most ABR OTT client devices will receive a manifest that has been individually customized for that ABR OTT client device.

The method by which the manifest is customized can take many forms, so long as the objective of providing a customized number of segmentation-units in a segment is met. An example embodiment is provided, but it will be understood that this embodiment is for illustration only and does not limit the claims provided herein. In one embodiment, a known range of numbers is mapped to specific numbers of segmentation-units per segment, e.g. each number or subrange of numbers within the known range can be mapped to a specific number of segmentation-units for inclusion in segments of the manifest. The mapping can be provided by a table lookup, a formula applied to each number in the range or by other means known in the art. A customization process receives an input value that lies within the known range and utilizes the mapping to provide the number of segmentation-units in a segment. In one embodiment, the known range is [1, segment length/segmentation-unit length] and the number of segmentation units NSEG is determined to be the floor of segment length/segmentation-unit length. In this embodiment, each segment of the manifest with the exception of boundary segments has the same number of segmentation-units.

In at least one embodiment, the number of segmentation-units in a segment varies within a single manifest. In one example embodiment, sub-ranges within the known range of numbers can be designated as indicating specific patterns of variation in the number of segmentation-units in a segment, e.g., the number of segmentation-units in a segment alternates between two values, or the number of segmentation-units in every tenth segment changes, or the number of segmentation-units in a segment is determined randomly for each segment. In one embodiment, the input value to the customization process is provided by a random number generator. In one embodiment, rather than using a random number generator, the customization process uses one or more of a subscriber identification, a client device identification, a client device location, a media identification, a media title, a segment size, a media bitrate, a maximum bitrate and an average bitrate to derive the input value, then maps the input value to a number of segmentation-units or a pattern of segmentation-units for the manifest.

FIGS. 2B-2H depict various additional blocks, steps and/or acts that may be combined with the elements of method 200A for facilitating network stream cloaking for stream privacy in the distribution and delivery of ABR OTT VOD according to one or more embodiments of the disclosure. In method 200B, the network node stores (210) the ABR manifest in the Controlled Cache and may forward a copy of the ABR manifest to a Controlled Cache at the content control. In the instant application, the Controlled Cache, which as previously mentioned can be a Controlled Blind Cache, controls the privacy of the ABR media assets stored therein using a number of techniques disclosed herein. The ABR media assets and manifests can be encrypted, although encryption is not a requirement to practice the disclosed embodiments. The ABR media assets in the Controlled Cache can be provided to ABR OTT client devices using HTTP or HTTPS; in the latter implementation, the Controlled Cache is considered a blind cache. The custom manifest generator generates (212) a custom manifest in response to the network node receiving a request for the ABR media asset, e.g., in a just-in-time process to provide the custom manifest. In one embodiment, in anticipation of a period of time in which a large number of requests for a particular ABR media asset are expected, some number of custom manifests can be prepared and stored at the Controlled Cache for use, but generally, the generation of custom manifests is performed on an as-needed basis.

In method 200C, the network node provides (216) segments within the custom manifest that comprise variable segment sizes and variable durations, e.g., by customizing both the number of segmentation-units in a segment and the types of variations that can occur within the manifest. Accordingly, the custom manifest generator is able to provide a large number of variations in both the customized manifests that are provided to the ABR OTT client device and in the actual segmentation in the customized streams of video for a single ABR media asset, greatly increasing the difficulty in identifying the ABR media asset being watched by a subscriber and increasing privacy.

Additional details relating to network stream cloaking for stream privacy are identified in the remaining flowcharts. In method 200D, a customization process in the custom manifest generator receives (220) an input value and maps (222) the input value to a number of segmentation-units in a segment. In one embodiment, the number of segmentation-units determined by the customization process is utilized for every segment within a manifest. In one embodiment, the number of segmentation-units determined by the customization process is taken as a base number of segmentation-units, with variations applied to the base number. In method 200E, the customization process maps (226) the input value to a pattern of variations in the number of segmentation-units in a segment, e.g., the base number of segmentation-units is utilized for two of every three segments, while the third segment has the base-number-plus-one segmentation-units.

In one embodiment shown in method 200F, the customization process obtains (230) the input value from a random number generator, such as a high quality random number generator as specified in NIST 800-90 standard. In one embodiment shown in method 200G, the customization process derives (234) the input value from one or more of a subscriber identification, a client device identification, a client device location, a media identification, a media title, a segment size, a media bitrate, a maximum bitrate and an average bitrate, e.g., by combining two or more of the described elements using a mathematical function to derive the input value.

The customized manifests will necessarily identify segments in ways that do not always reference an entire URL. The byte-range to be returned for a given segment can be specified in several ways, depending on the client application used by the ABR OTT client device. The HLS specification provides for an EXT-X-BYTERANGE tag, which indicates that a referenced media segment is a sub-range of the resource identified by the associated URI. The EXT-X-BYTERANGE tag applies only to the next URI line that follows it in the playlist. The format is: #EXT-X-BYTERANGE:<n>[@<o>], where n is a decimal-integer indicating the length of the sub-range in bytes. If present, o is a decimal-integer indicating the start of the sub-range as a byte offset from the beginning of the resource. If o is not present, the sub-range begins at the next byte following the sub-range of the previous media segment. If o is not present, a previous media segment must appear in the playlist file and must be a sub-range of the same media resource; otherwise the media segment is undefined and the playlist will be rejected.

For DASH clients, content within a representation may be divided into segments for accessibility and delivery. A URL is provided for each segment, with optionally a byte-range within the URL also provided. Segments may be further subdivided into sub-segments, each of which contains a whole number of complete access units. If a segment is divided into sub-segments, these are described by a compact segment index, which provides a corresponding byte range in the segment occupied by each sub-segment.

A segment is either referenced by an HTTP-URL included in the MPD or a data URL as defined in RFC 2397 included in the MPD. An HTTP-URL is defined as an <absolute-URI> according to RFC 3986, Clause 4.3, with a fixed scheme of "http" or "https", which may be restricted by a byte range if a range attribute is provided together with the URL and identifies a contiguous range of bytes. Data URLs should only be used if explicitly permitted by the profile and the guidelines and recommendations in RFC 2397 should be taken into account.

The semantics of elements of type URLType are shown in Table 1:

TABLE 1

| Element or Attribute Name | Use | Description |
| --- | --- | --- |
| Element of type URLType | | defines an HTTP-URL |
| @sourceURL | O | specifies the source URL part and shall be formatted either as an <absolute-URI> according to RFC 3986, Clause 4.3, with a fixed scheme of "http" or "https" or as a <relative-ref> according to RFC 3986, Clause 4.2. If not present, then any BaseURL element is mapped to the @sourceURL attribute and the range attribute shall be present. |
| @range | O | specifies the byte range restricting the above HTTP-URL. The byte range shall be expressed and formatted as a byte-range-spec as defined in RFC 7233, Clause 2.1. It is restricted to a single expression identifying a contiguous range of bytes. If not present, the element refers to the entire resource referenced in the @sourceURL attribute. |

Another method of HTTP/HTTPS byte range requests for segment data may be performed using regular HTTP GET methods. There exist deployments where HTTP partial GET is either not supported or results in the return of the entire, rather than partial target. This represents a problem for DASH clients. While it is expected that these problems will gradually disappear, until this is the case, a method is provided to not exclude DASH clients operating in this environments and service providers wanting to support such clients, are excluded from using this DASH standard to deploy media streaming services using the formats defined in this part of ISO/IEC 23009. Still it is expected that this annex will be deprecated in some later versions of this standard.

To address these requirements, the BaseURL@byteRange attribute may be present. If present, it provides information that resources offered in the MPD but are requested by a HTTP partial GET (e.g. Segments for which HTTP-URLs contain byte ranges or SubSegments) may also be requested using a regular HTTP GET by mapping the information that is otherwise added in the Range header into the request URI of a regular HTTP GET request. It is expected that DASH clients only use this method if HTTP partial GET requests fail. If DASH clients only have this alternative to request Segments or SubSegments, then it is expected that they request single units of Segments or SubSegments.

Accordingly, in method 200H, the custom manifest generator bases (238) segment URIs in the custom manifest on one of an EXT-X-BYTERANGE tag, an HTTP byte-range header and a BaseURL@byteRange attribute.

Client Stream Cloaking for Stream Privacy

Turning next to FIGS. 5A-5D, the client applications and/or client proxy applications on ABR OTT client devices can utilize additional methods and techniques in order to provide stream cloaking with regard to stream privacy for the content being consumed by the ABR OTT client devices. In one embodiment, the disclosed methods and techniques are performed in a client application, e.g., an IOS/Android application, browser application, Apple TV application, OTT-STB application, or Chromecast application. In embodiments in which a client proxy is utilized, the methods can be implemented in the client proxy or similar application. Received segments are encrypted using CENC protection schemes as discussed below. Manifests can be encrypted and signed. An ABR OTT client device in which method 500A is implemented receives (502) a manifest for an ABR media asset, the manifest comprising a segmentation-units index that points to segmentation-units in the ABR media asset, e.g., the manifest shown in FIG. 3 and the segmentation-units index shown in FIG. 4. In some embodiments, the manifest provided to the ABR OTT client device is the manifest produced at a packager in the content provider network. In other embodiments, the manifest has been customized according to the network stream cloaking for stream privacy methods disclosed herein. Regardless of the details of the received manifest, by accessing the segmentation-units index that is part of the manifest, the ABR OTT client device can utilize byte-range requests to rearrange the order in which the ABR media asset is retrieved from the network, thus achieving a stream of the ABR media asset from the Controlled Cache that is unique. When the stream of media is unique, third parties who are able to snoop the media stream are unable to match the media stream to any known ABR media asset, thus defeating attempts to identify what a client is watching while providing the desired privacy. Accordingly, the ABR OTT client device uses (504) the segmentation-units index and a customization process to produce and send randomized byte-range requests for portions of the ABR media asset.

As noted above, the customization process seeks to create a unique stream of the requested ABR media asset within the bounds of timing required for processing and presenting the ABR media asset to a media player for presentation to a subscriber. In general, when presenting OTT ABR media, a client application or client proxy will download a predetermined amount of media before media presentation will begin, e.g., to ensure that there are no breaks in the presentation if network congestion is encountered after media presentation has begun. In an example in which the client application downloads ten seconds of media prior to initiating the presentation, the customization process can initially randomly request media segmentation-units from anywhere in the first ten seconds of the ABR media asset, so long as the customization process requests all of the necessary media in a given time.

Once presentation of the media to a user begins, the customization process can continue to randomly download portions of the media so long as time constraints for downloading and/or presentation are observed. In one embodiment, limitations can be placed, for example, on how far ahead in the presentation the customization process may request media segments. The customization process can provide indicators of which segments have already been requested and provide guidelines for the degree of overlapping of segments that is allowed or desired. A specific example of a customization process is given below.

The client application or client proxy receives (506) the requested portions of the ABR media asset. As the requested portions are received, the client application or client proxy reassembles (508) the ABR media asset in order and provides (508) the reassembled ABR media asset to a media player in the ABR OTT client device for presentation to the user. Notably, the client application or client proxy can receive segments having varying durations, but will pass on constant duration segments to the local media player, except where there is a break or a last segment. The user will be unable to detect that the media was not downloaded in the same order as the presentation, yet the uniqueness of the stream assists in preserving privacy.

Figure 5A:
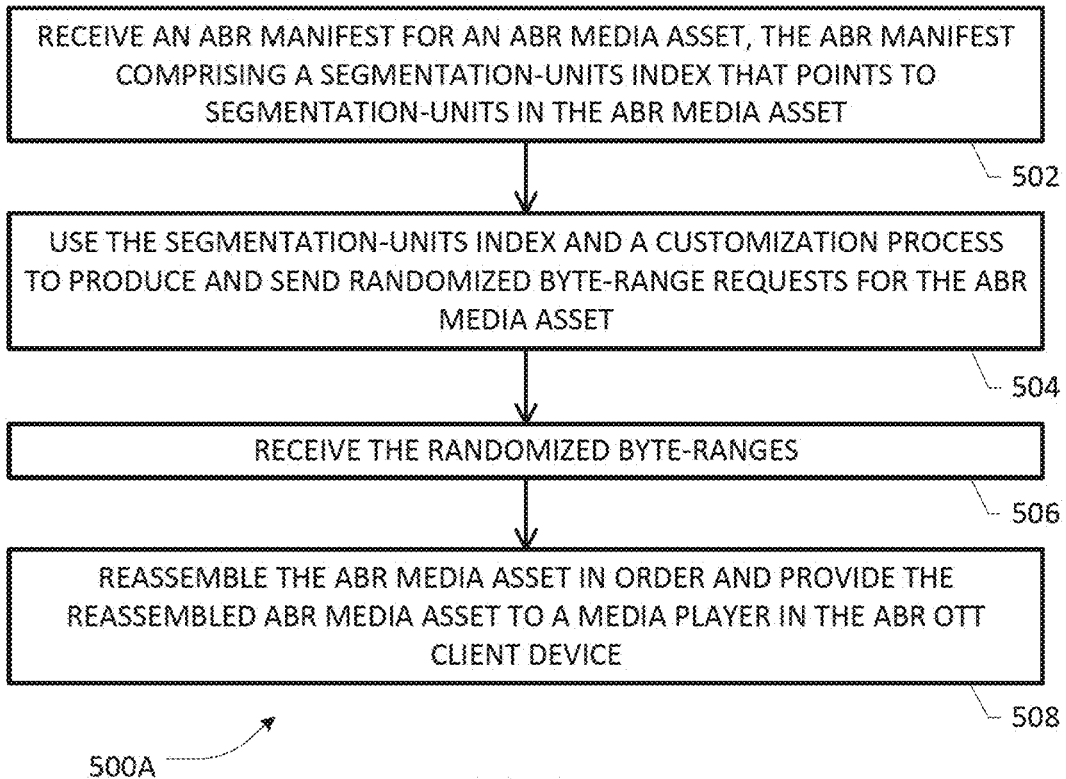
Figure 5B:
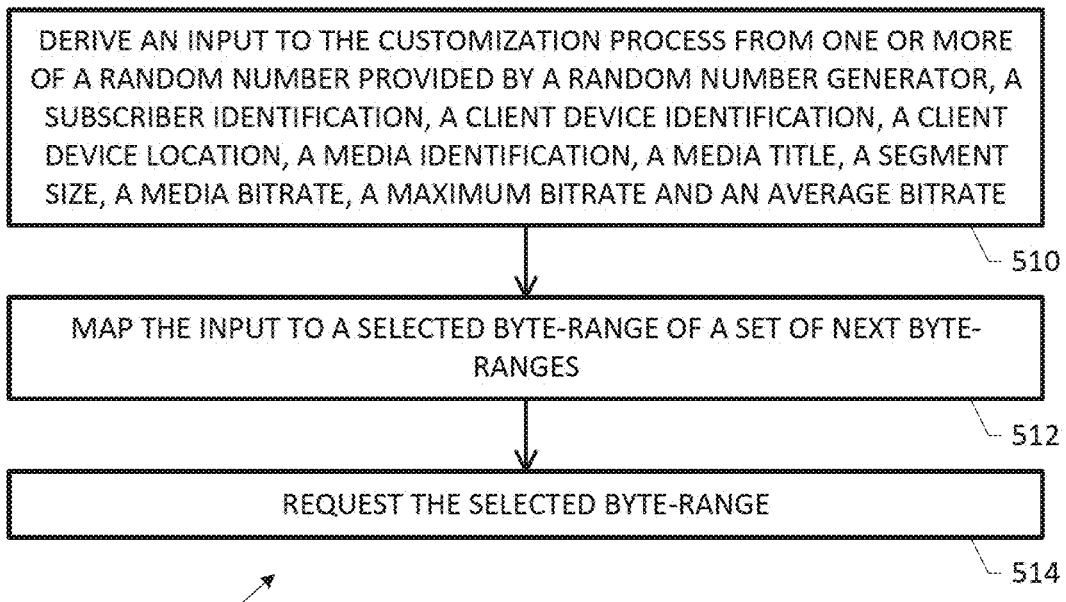

Methods 500B-500D depict further details that can be used with the method of providing client steam cloaking for stream privacy shown in FIG. 5A. In one embodiment shown in method 500B, the client application or client proxy derives (510) an input to the customization process from one or more of a random number provided by a high-quality random number generator as specified in NIST 800-90 standard, a subscriber identification, a client device identification, a client device location, a media identification, a media title, a segment size, a media bitrate, a maximum bitrate and an average bitrate, either by utilizing the value directly or by combining two or more of the potential values, e.g., in a mathematical function. The input can be between a lower bound and the length of a segment, where the lower bound is configurable and is, for example, 4096 bytes. If the segment is less than the lower bound, then the request is not randomized. Once the input is determined, the customization process maps (512) the input to a selected byte-range of a set of next byte-ranges and requests (514) the selected byte-range from the server.

In one example embodiment, the input to the customization process is designed to fall within a selected range of values and the customization process is designed to randomize byte-range requests within a given ten-second period of media that will be required next. Each value or sub-range of values within the given range is mapped to a specific byte-range within the ten-second period of media, where the specific byte-range includes, e.g., one or more segmentation-units. Each time a segment is to be requested, a new input is provided to the customization process and a new byte-range request is sent. In at least one embodiment, the customization process multiplexes (516) a set of byte-range requests from multiple segments of the ABR media asset. In at least one embodiment, the customization process issues (518) a first byte-range request that overlaps a second byte-range request. By providing overlapping requests, some portions of the ABR media asset are sent multiple times, which can obscure the total size of the ABR media asset and further frustrate identification. Features mentioned herein, e.g., how the input to the customization process is derived, the degree of overlap that is allowed in requested byte-range requests, how far ahead the customization process can request portions of the ABR media asset and the specific method of mapping the input to specific byte-range requests are implementation specific and are not intended to be limitations to the scope of the disclosed embodiments.

Cloaking of Content and Manifests for Stream Privacy Under HTTP

A third method for providing stream privacy is disclosed herein that was designed for use when the ABR media assets are delivered using unsecure HTTP and thus needed additional protection to provide the desired privacy. Although this third method is discussed in terms of use with an unsecure transport protocol, it will be understood that use of the disclosed methods with a secure transport protocol is also part of the inventive disclosure. Unless special precautions are used under HTTP, the manifests and media are visible to anyone able to access the cache of ABR media assets and/or the communications between the ABR OTT client device and the cache. The following elements can be utilized to provide stream cloaking under HTTP: a) encryption of both the manifest and the segments of the ABR media asset as well as signing of the manifest, b) obfuscation of URLs/URIs and/or byte-ranges, whether provided in the manifests or in client requests for the ABR media asset, c) the manifest sent to each client device is customized by the addition of custom comment tags, and d) the segments sent to each user are customized by including masking content or "fake bytes", e.g., extraneous data that is provided solely to obscure the size and/or the pattern created by the variable bitrate encoding of the segments.

In at least one embodiment, the ABR media asset is provided using a CMZF container format mentioned previously. Using the CMZF container format, encryption with Common encryption (CENC) protection schemes can be provided for the manifests and segments at the packager. The manifest and segments are then sent to the Controlled Cache where the manifest and segments can be securely stored under the content provider's control. The encrypted manifests may also be provided to a content control node. The CMZF format provides an advantage in that once the ABR media asset is encrypted at the headend, the contents can remain encrypted until it reaches the client device; the intermediate processing can be performed without decrypting.

In one example implementation, media content assets may be encrypted using one or more encryption schemes regardless of a particular payload of masking content. Example encryption schemes may comprise, for example, standards-based encryption schemes such as at least one of a Common Encryption (CENC and CENS-TS) protection scheme using Advanced Encryption Standard (AES) 128-bit keys in Counter mode (CTR), a CENC protection scheme using AES 128-bit keys in Cipher-block chaining mode (CBC), a CENC CTR mode using a subsample pattern of unencrypted bytes and encrypted bytes of the media content asset's audio/visual (A/V) data ('cens' scheme), a CENC CTR mode using a subsample pattern of unencrypted bytes and encrypted bytes of the media content asset's audio/visual (A/V) data ('cenc' scheme), a CENC CBC mode using another subsample pattern of unencrypted bytes and encrypted bytes of the media content asset's A/V data ('cbcs' scheme), a CENC-TS mode "cf" using a subsample pattern encryption scheme with AES 128-bit keys in CBC mode, a CENC-TS mode "cf" using a subsample pattern encryption scheme with AES-128 bit keys in CTR mode and a CENC-TS mode "cf" using a subsample encryption scheme ('cenc') with AES-128 bit keys in CTR mode, and the like. In one arrangement, ISOBMFF-based carriage of multi-encrypted media may be facilitated by providing a main track in association with a plurality of variant tracks, wherein different tracks may be encrypted using different schemes, which may be referred to as "normalized encryption". As one skilled in the art will recognize, ISO/IEC 23001-12 [SMPLEVAR] specification, incorporated by reference herein, defines carriage of sample variants in the ISOBMFF format based on the following constructs: Sample Variant (which represents an assembled media sample replacing an original sample); Variant Byte Range (indicating the location of a sequence of bytes that might constitute a portion of a Sample Variant; Variant Constructor (Sample Variant metadata that defines how to assemble an individual Sample Variant); and Variant Media Data (which identifies media data used to construct a Sample Variant, some of which may come from the original sample media data).

Obfuscation of URLs/URIs and/or byte-ranges can be accomplished using either of two methods: 1) shared key method or 2) SHA 256 hash method. Using one of these methods, at least the portion of the URL/URI that covers the resource name and the byte range are obfuscated. In one example embodiment, a URL is provided as http://servername[/optional non obfuscated URL part/]{obfuscated URL part}[/optional non-obfuscated URL part], where the obfuscated URL part is encrypted with a shared key or hash. A shared key can be, for example, 128 bits AES encryption CBC mode with padding (PKCS7). Keys can be derived from a high quality entropy source used as a seed to a deterministic random bit generator (DRBG) to generate a random number as specified in the NIST 800-90 standard. The Controlled Cache maintains a mapping of obfuscated URLs/URIs and byte ranges to segment variants and byte-ranges and will share this mapping with the ABR OTT client device as necessary to allow the ABR OTT client device to request byte-ranges out of order from the manifest.

In embodiments in which the manifests and segments of an ABR media asset are delivered via HTTP, a custom manifest generator, such as custom manifest generators 118/120, generates custom manifests as described above with regard to the server stream cloaking for stream privacy. As a custom manifest is generated in an HTTP embodiment, masking content is added to the manifest in the form of comment tags that modify the length of the manifest but carry no weight with regard to processing of the manifest or segments. The comment tags added to the manifest may include stock phrases that have been previously selected for use as s tags in the custom manifests or may be random characters that are incorporated into the manifests by the custom manifest generators. In one embodiment, a random number generator is used to select the phrase or random characters that are added to the custom manifest. When received at the ABR OTT client device, no processing will occur with regard to the custom comment tags.

In one embodiment, masking content in the segments is provided using sample variant tracks, which are described herein. However, it will be understood that other methods of providing masking content in the segments are also covered by the present disclosure. In one example, one or more sample variant tracks may be used for signaling one or more encryption schemes, either full sample or partial sample (or, subsample), identified by a series of Key IDs (KIDs), in an arrangement referred to as Sample Variants for Normalized Encryption or SVNE. In one specific illustrative use case scenario, sample variants of the present invention may involve ISOBMFF tracks to carry sample data with one or more different encryption schemes, e.g., "cbcs" and "cens", which use subsample pattern based encryption of the video streams (i.e., 1 out of 10 blocks (pattern) of data is encrypted). In the stream privacy embodiments herein, sample variants tracks may be configured to carry only encrypted part of sample data (e.g., 10% of sample data) with a different encryption scheme (for example "cens" subsample pattern based scheme) from the main/base track sample data (with "cbcs" subsample encryption scheme), or vice versa. In an example arrangement, multiple sample variants are provided for every sample, although not all of the multiple sample variants will be provided to every client. If every sample in the main track has a sample variant, ISOBMFF can carry multiple sample variant tracks with just over 10% overhead for each sample variant track. In other arrangements, the sample variant track can have a different pattern than the main track, if needed, for example like 20% or 30% data subsample data encrypted (2 of 10 blocks or 3 out of 10 blocks etc.). In one example stream privacy use case, two tracks of a media content asset may be provided, with one main track that carries samples with one (i.e., first) encryption scheme and another sample variants track that carries samples in a different (i.e., second) encryption scheme. In an illustrative arrangement, for every sample in the main track, there may be provided an associated sample variant in the sample variant track, wherein the sample variants may have the same KID(s) as the main track samples. In another arrangement, the sample variants may be provided with KID(s) different than the main track's KID. Additional details relating to SVNE-based carriage of multi-encrypted media may be found in the following commonly owned patent application(s): (i) "MEDIA DISTRIBUTION WITH SAMPLE VARIANTS FOR NORMALIZED ENCRYPTION", application Ser. No. 15/379,009, filed Dec. 14, 2016 (hereinafter referred to as the "SVNE patent application"), each of which is incorporated by reference herein.

In accordance with the teachings of the present patent application a packager/encryption node operating in conjunction with a privacy module, such as privacy module 105, may be provided for facilitating stream cloaking of a media content asset for privacy under HTTP based on multiple tracks and/or multiple payloads of masking content. In one arrangement, constructs similar to the SVNE constructs described in the SVNE patent application may be provided, mutatis mutandis, wherein multiple identifiers (referred to herein as privacy IDs) may be utilized in individualizing different payloads of masking content for various tracks, e.g., independent of any encryption schemes being utilized (signaled by a separate or the same set of KIDs, referred to as encryption KIDs (encKIDs) to provide distinction). Privacy module 105 can facilitate generation of a plurality of elementary steams (ES) having different payloads of masking content for a media content asset, which may be segmented and packaged into composite segments in a suitable container format, with each composite segment having different variant tracks based on the keys provided by a key server, e.g., key server 112. Packaged composite segments may be provided to Controlled Cache 110. A privacy session manager (PVSM) module 132 may also be disposed in association with custom manifest generator 120 for generating suitable custom manifests and customized segments that contain extraneous data that has been customized for the ABR OTT client device. In one arrangement, an ABR OTT client device or an application executing thereon may include extractor functionality that is adapted to extract/ assemble a track to generate a deliverable media segment variant with appropriate DRM and delivery format, but with the masking content removed, for delivery to a media player. In some embodiments, the masking content does not need to be removed prior to delivery of the content.

Sample variant (SV) tracks based on ISOBMFF may be provided for carrying masking content similar to the carriage of the multi-encrypted media as set forth in the SVNE patent application referenced hereinabove. As at least some example embodiments of the present invention particularly relate to ISOBMFF-based container format, a brief overview is set forth immediately below. ISOBMFF (ISO/IEC 14496-12, incorporated by reference herein) defines a general container or wrapper structure in a flexible, extensible format that facilitates interchange, management, editing and presentation of time-based multimedia files such as audio and video, which may form a basis for other container formats, wherein the presentation may be local, or via a network or other file-based delivery mechanism. In general, the media file format sets forth an object-oriented file structure and contains the timing, structure, and media information for timed sequences of media data, such as audio-visual presentations. A file can be decomposed into basic objects wherein the structure of the objects may be implied from their type. Files conforming to the ISOBMFF standard are formed as a series of objects, called "boxes" as noted elsewhere in the present patent application. All data is contained in boxes and there may be no other data within the file. The "box" is an object-oriented building block defined by a unique type identifier and length. A presentation (motion sequence) may be contained in several files. All timing and framing (position and size) information must be in the ISO base media file and the ancillary files may essentially use any format to the extent they are capable of description by the metadata defined in ISO base media file format. In order to identify the specifications to which a file based on ISOBMFF complies, brands are used as identifiers in the file format. They may be set in a box named File Type Box ("ftyp"), which must be placed in the beginning of the file. A file that supports streaming includes information about the data units to stream (e.g., how to serve the elementary stream data in the file over streaming protocols). This information is placed in additional tracks of the file called "hint" tracks. Separate "hint" tracks for different protocols may be included within the same file. Additional boxes relating to streaming include "moov" box, "mdat" box, "moof" box, etc., which may be utilized in example composite segment tracks described below.

Figure 7:
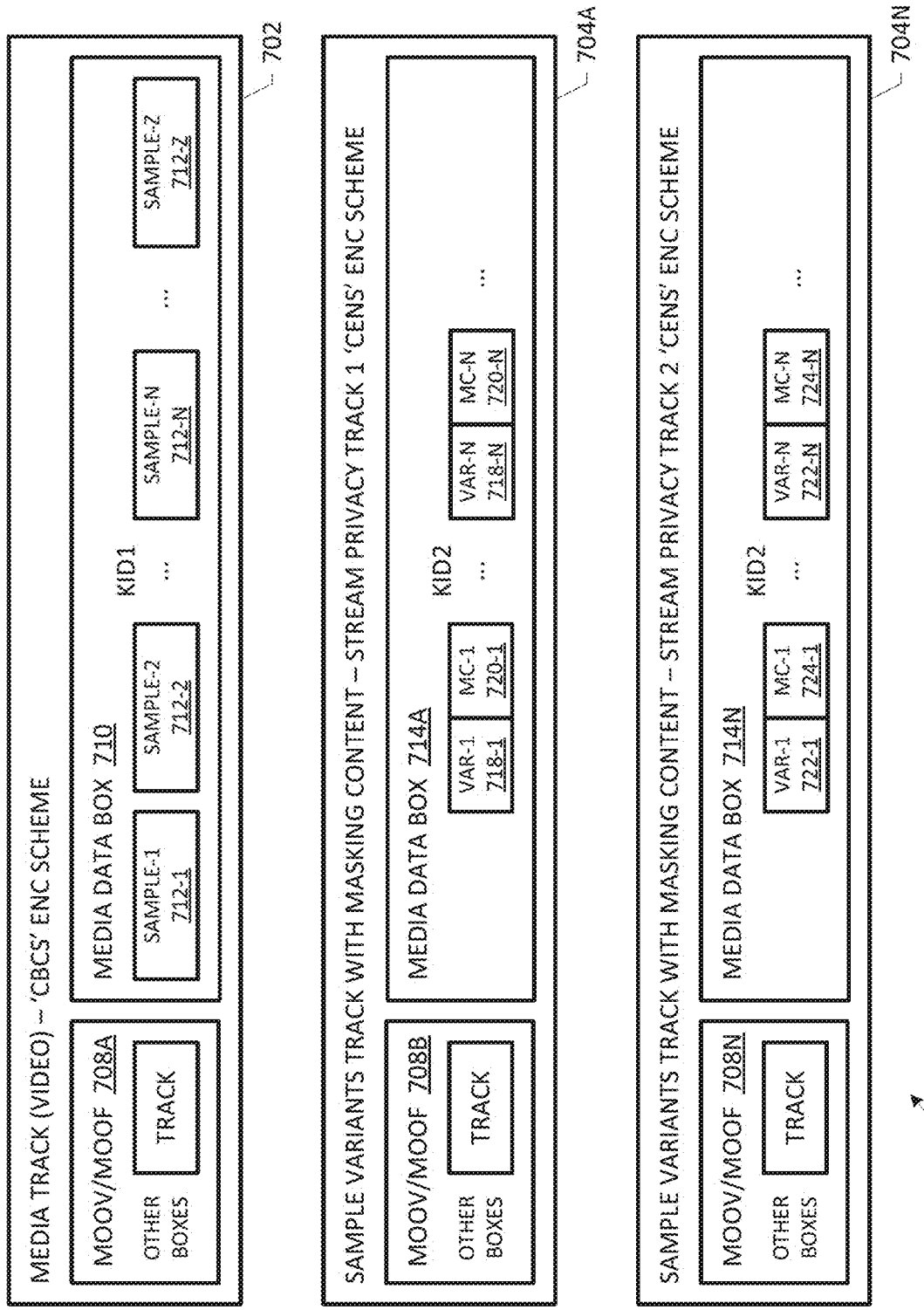
FIG. 7 depicts example composite segments containing a main track and one or more sample variant tracks, each having both a media content asset and masking content for purposes of one or more embodiments of the present patent disclosure.

FIG. 7 depicts an example segment track scheme 700, with composite segments containing a main media track 702 and one or more sample variant tracks 704, each having payload of masking content in accordance with one or more embodiments of the invention, which may be generated by a headend facility associated with a content publisher and suitable DRM entities, e.g., packager/encryption node 108. As noted previously, sample variant data may be stored in one or more ISOBMFF metadata tracks (variant tracks) with which an ISOBMFF video media track (media track) may be associated. Example segment track scheme 700 illustrates a main media track 702 having a 'cbcs' encryption scheme, along with two associated sample variant tracks 404A, 404N, each having a 'cens' encryption scheme but different payloads of masking content. As per the ISOBMFF standard, each track may be provided with appropriate MOOV/ MOOF, Track and other boxes, illustrated respectively at 708A, 708B, 708N. When an association is established between a media track and a variant track, sample variant processing may be executed whenever a decoder/extractor does not have access to the KID/key defined for a sample in the media track.

In one implementation, a given sample variant track is always associated with a corresponding video media track, though the converse need not always true. Further, samples within associated tracks are considered associated if they are time-parallel. A plurality of samples 712-1 to 712-Z are illustrated as part of the Media Data Box 710 of the main media track 702, wherein KID1 is provided for identifying or otherwise signaling the encryption scheme. Sample variant track 704A includes a Media Data Box 714A illustrated with sample variants 718-1 to 718-N, which have masking content 720-1 to 720-N, that is also signaled using KID1 for the encryption scheme. On the other hand, sample variant track 704N includes a Media Data Box 714-N illustrated with sample variants 722-1 to 722-N, which have masking content 724-1 to 724-N, that is signaled using a different KID, i.e., KID2, for the encryption scheme being used.

Masking content 720, 724 can be selected from similar content and in at least one embodiment is taken the ABR media asset, although that is not a requirement. In at least one embodiment, masking content 720 and masking content 724 contain at least a portion of the same video content, although each sample variant track contains different amounts of the masking content. In at least one embodiment, sample variants 718-1 to 718-N are identical to sample variants 722-1 to 722-N, such that the main difference between sample variants track 204A and sample variants track 204B is the amount of masking content carried in each sample variant track. Although sample variants tracks 704A through 704N are shown as having different keys, this is not a requirement; in one embodiment, all of sample variant tracks 204 can be encrypted with the same key.

As will be seen in greater detail below, an ABR media asset is packaged with a number of sample variant tracks at a headend node, e.g. packager/encryption node 108 and sent to a Controlled Cache until requested by an ABR OTT client device. When an ABR OTT client device requests the ABR media asset, the manifest sent to the ABR OTT client device will be customized by randomly selecting a set of sample variants tracks that will be included with the main track. An overview of sample variant (SV) processing at the ABR OTT client device is provided below with respect to example media input tracks and processed output tracks, which may be applied in an example scenario of stream privacy for HTTP according to an embodiment of the present invention.

Taking reference to FIG. 8A, an example SV processing scenario 800A illustrates an arrangement where a particular sample of an encoded media content asset has a plurality of sample variant tracks that require processing by a receiver for proper output. In this arrangement, three samples are shown in a series from left to right, i.e., samples 806, 808, 810, in a top row 802 that conceptually represents a media data stream obtained from an encoding process using, e.g., using ISOBMFF or MPEG-2 TS, which may be input to a downstream SV processing functionality. Whereas the first and third samples 806, 810 are shown as each having only one respective data stream portion, the middle sample 808 is shown having a base sample 808-1 as well as three variants 808-2 to 808-4. Each of the three samples are identified by a KID parameter respectively associated therewith, KID1 to KID3, with the second sample's variants having their own respective KIDs, KID2a-KID2c, while the base sample 808-1 has a KID2. Output 804 obtained from the SV processor contain the same first and third samples 804, 810 as output first and third samples 816, 820 respectively, whereas only one of the variants of the middle input sample 808 is output as sample 818. Access to samples and their variants may be provided under the control of KIDs as depicted in the input row 802 of the arrangement shown in FIG. 8A. In one embodiment, two or more of the sample variants utilize the same key; a first sample variant track that is accessible to the ABR OTT client device can be selected for processing. In one implementation, a hierarchy of KIDs may be used for sample variants, which may be used to provide access to data, with the higher level KIDs providing access to sample variant Metadata and the lower level KIDs providing access to media data.

Figure 8B:
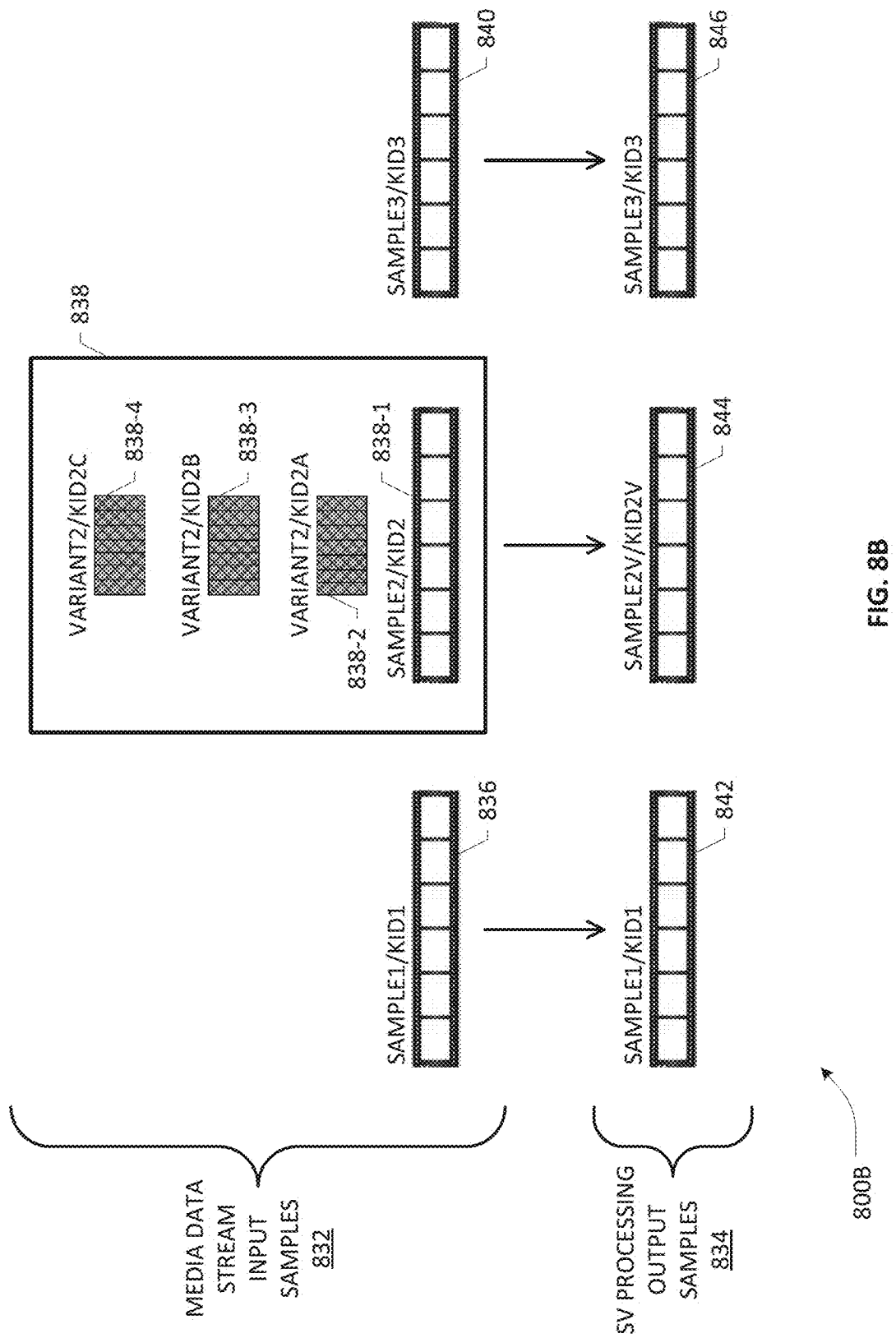

FIG. 8B depicts another scenario 800B in which a sample (middle sample 838) of an input stream 832 has a number of sample variants (e.g., three variants 838-2 to 838-4) along with a base sample 838-1, whereas first and third input samples 836, 840 each have a single respective data stream portion as in the previous scenario of FIG. 8A. In this case, however, only the data that differs from the original sample is carried in the samples of the variant data stream. Accordingly, whereas base sample 838-1 is a full sample, sample variants 832-2 to 832-4 are subsamples or partial samples that differ from the full sample data of the base sample 838-1. As in the scenario 800A of FIG. 8A, input stream 832 may be representative of a stream encoded according to ISOBMFF or MPEG-2 TS whereas an output stream 834 is representative of samples obtained after processing by a downstream SV processor (e.g., provided at a ABR OTT client device), with access to samples controlled via KIDs as depicted in the top row. Based on KIDs, output samples comprise a first output sample 842, a second output sample 844 assembled or generated from the second input sample 838-1 and its variants 838-2 to 838-4, and a third output sample 846. In one arrangement, sample variants can reference byte ranges of the original media data stream in addition to those of the current variant data stream, as well as additional variant data streams. Skilled artisans will recognize that such an arrangement involving subsampling or partial sampling can enable more efficient carriage of sample variants than if sample variants are to be encoded in their entirety (i.e., full samples).

Figure 6B:
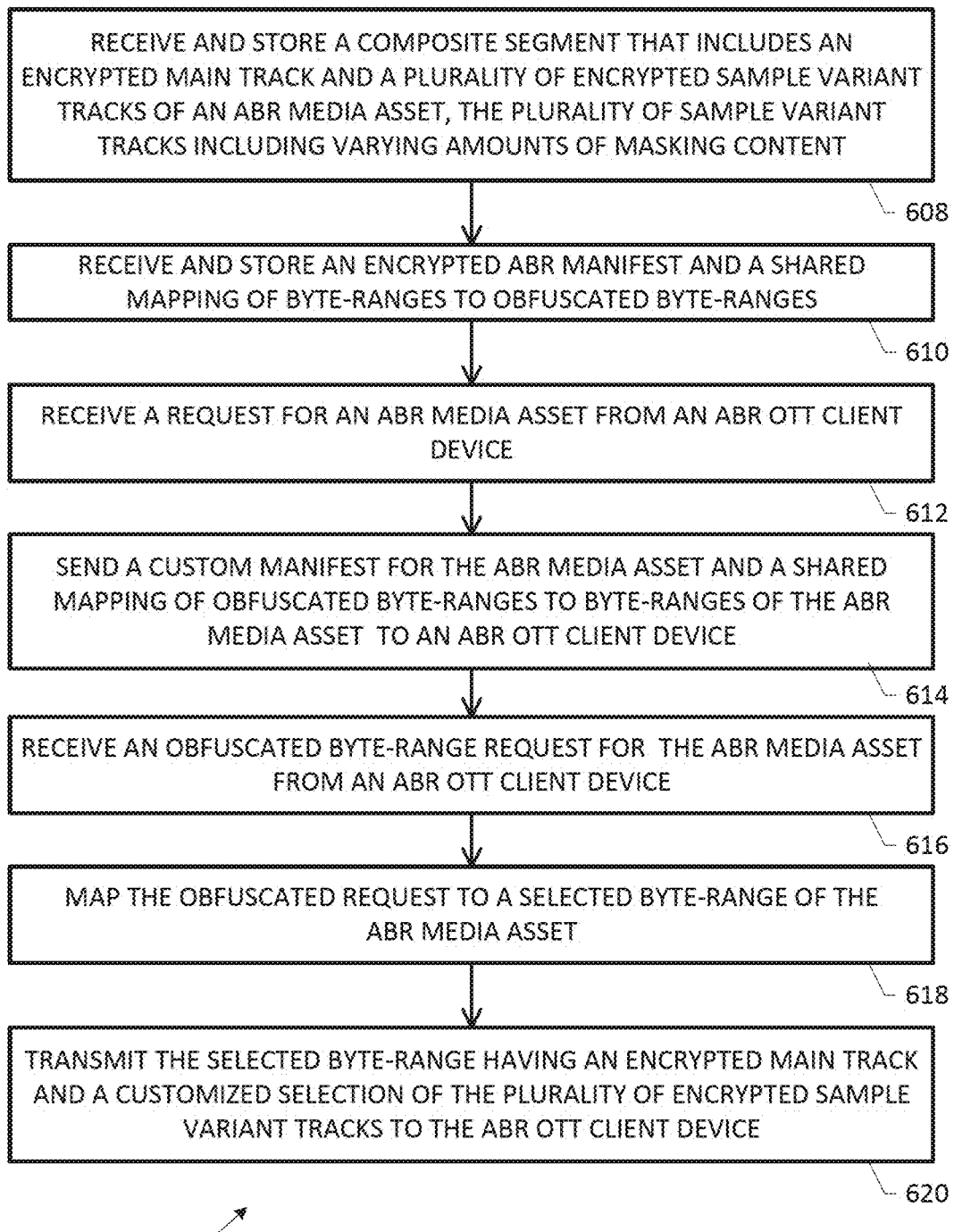

Turning next to FIG. 6A, a method 600A for facilitating privacy during delivery of ABR media content over HTTP is performed at a packager such as packager/encryption node 108, which provides multiple sample variant tracks. The specific sample variant track or tracks that will be sent to a specific ABR OTT client device is determined at the Controlled Cache or content controller, but the tracks are included in the ABR media asset at a packager located at the headend. As seen in method 600A, the packager provides (602) composite segments that each include a main track and a plurality of sample variant tracks of an ABR media asset. In accordance with an embodiment of the disclosure, one or more of the sample variant tracks include varying amounts of masking content. In at least one embodiment, each of the sample variant tracks contains a customized amount of masking content that varies from each of the other sample variant tracks. The masking content is typically video content and may be formed from the corresponding base sample. In one embodiment, the video content is a copy or partial copy of valid video content carried in the sample variant. In at least one embodiment, the size of the masking content is customized for each of the sample variant tracks so that each sample variant track contains a different number of bytes. The packager then encrypts (604) the composite segments using one or more encryption schemes and transmits (606) the composite segments to a Controlled Cache for delivery to ABR OTT client devices. In one embodiment, the packager encrypts the sample variant tracks using one of a Common Encryption (CENC) Counter (CTR) mode using a sub-sample pattern of unencrypted bytes and encrypted bytes of the ABR media asset's audio/visual (A/V) data ('cens' scheme), a CENC Cipher-block chaining mode (CBC) mode using another sub-sample pattern of unencrypted bytes and encrypted bytes of the media content asset's A/V data ('cbcs' scheme), a Common Encryption Transport Stream (CENC-TS) mode "cf" using a sub-sample pattern encryption scheme with AES 128-bit keys in CBC mode, and a CENC-TS mode "cf" using a sub-sample pattern encryption scheme with AES-128 bit keys in CTR mode. In one embodiment, the encryption mode and encryption key(s) utilized for the sample variant tracks may be the same as those used for the main track. In one embodiment, the encryption mode and encryption key(s) utilized for the sample variant tracks are different from those used for the main track. In at least one embodiment, two or more sample variant tracks share a common key and any of the sample variant tracks that share the common key can be used interchangeably during processing of the ABR media asset.

As seen in method 600B, the method of stream cloaking of the segments under HTTP continues at a network node that includes a Controlled Cache such as Controlled Cache 110. The network node, which may be an origin node, an edge node or a JIT-P node, receives and stores (608) a composite segment that includes the encrypted main track and the plurality of encrypted sample variant tracks of the ABR media asset. One or more of the sample variant tracks include varying amounts of masking content. The node also receives and stores (610) an encrypted ABR manifest for the ABR media asset. When the network node receives (612) a request for the ABR media asset from an ABR OTT client device, the network node sends (614) both a custom manifest for the ABR media asset and a shared obfuscation map, i.e., a mapping of obfuscated byte-ranges to byte-ranges of the ABR OTT client device. In one embodiment, the shared obfuscation map provides a mapping of obfuscated URLs, URIs and byte-ranges for the ABR media asset to actual URLs, URIs, and byte-ranges for the ABR media asset stored at the Controlled Cache. The obfuscation map is encrypted to ensure that the mapping itself is not available to third parties. In one embodiment, the obfuscation map can be a shared key that is utilized by both the Controlled Cache and the ABR OTT client device to encrypt the URL, URI and byte-ranges on-the-fly as segments of the ABR media asset are requested. In one embodiment, the mapping is a table of pre-computed byte-ranges that corresponds to selectable byte-ranges available to the ABR OTT client device. In one embodiment, the mapping is a pre-computed shared table that is part of the code of instructions provided as part of both the network node providing the ABR OTT media asset and the ABR OTT client device receiving the media asset. The mapping needs to be both shared and encrypted for privacy protection.

When the ABR OTT client device requests specific portions of the ABR media asset, the ABR OTT client device does so by sending an obfuscated request using the shared obfuscation map. Even if intercepted, the obfuscated request will not provide identifying information to an outside entity. The network node then receives (616) the obfuscated byte-range request for the ABR media asset from the ABR OTT client device and maps (618) the obfuscated byte-range request to a selected byte-range of the ABR media asset. Once the selected byte-range is determined, the network node transmits (620) the selected byte-range having a main track and a customized selection of the plurality of encrypted sample variant tracks to the ABR OTT client device. Inclusion of the customized selection of encrypted sample variant tracks means that while the duration of a given segment remains the same, the size of the segment sent to the ABR OTT client device can be different for each ABR OTT client that requests the segment, increasing the difficulty of fingerprinting the ABR media asset. The customized selection of sample variant tracks can be determined by a customization process prior to sending the ABR media asset to the ABR OTT client device. In one embodiment, a input to the customization process that is used to select a number of segmentation units to include in a segment may also be used to determine a specific combination of sample variant tracks to send to the ABR OTT client device, although it is not necessary to use the same inputs for both processes.

Figure 6C:
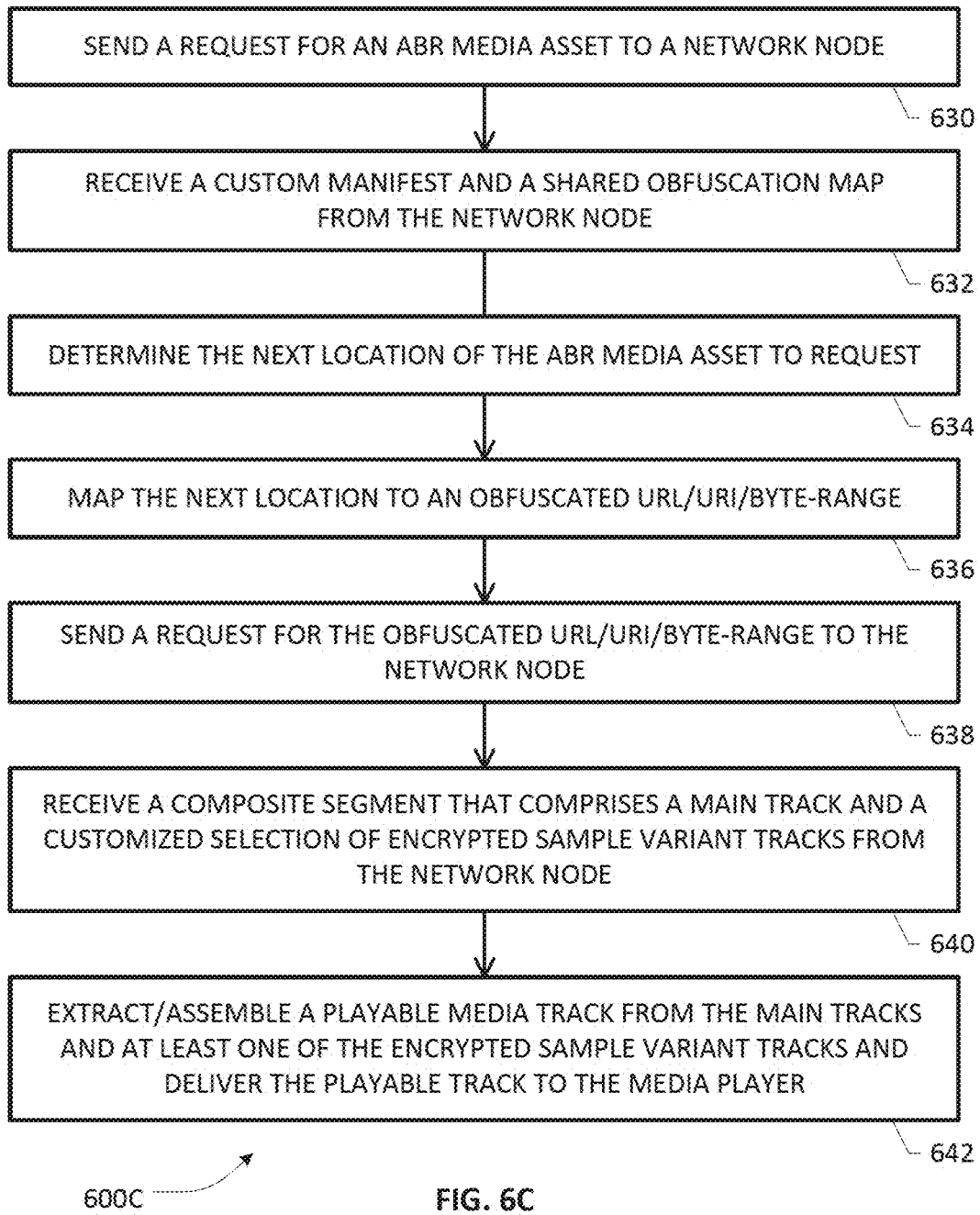

FIG. 6C depicts the method 600C of stream cloaking under HTTP as seen from the ABR OTT client device. In one embodiment, the disclosed method is performed by a client application, e.g., an IOS or Android application. In one embodiment, the disclosed method is performed by a client proxy on the ABR OTT client device. When a subscriber decides to watch an ABR OTT presentation, the ABR OTT client device, which can be, for example, ABR OTT client device 124 in FIG. 1, sends (630) a request for the ABR media asset that has been selected to a serving network node. In return, the ABR OTT client device receives (632) a custom manifest and the shared obfuscation map for the ABR media asset from the network node. The client application or client proxy determines (634) the next location to request from the network. As will be seen in the discussion of ABR stream privacy workflows below, the stream cloaking under HTTP can be combined with client stream cloaking for stream privacy, in which case, the downloading of the ABR media asset may be performed out of order, although this is not a requirement for practicing cloaking of content and manifests for stream privacy under HTTP. Once the client application or client proxy determines the next location to request, the desired location is mapped (636) to an obfuscated value, which can be an obfuscated URL, URI or byte-range. The ABR OTT client device sends (638) a request for the obfuscated URL, URI or byte-range to the network node and in return, receives (640) composite segments having a main track and a customized selection of encrypted sample variant tracks from the network node. The ABR OTT client device then extracts/assembles (642) a playable media track from the main track and at least one of the sample variant tracks, the media track having an appropriate DRM and delivery format. In some, but not all embodiments, the masking content is removed when forming the playable media track. If the byte-ranges have been requested out of order, the ABR media asset is correctly ordered as the extraction/assembly occurs.

ABR Stream Privacy Workflows

Having disclosed three separate concepts for providing stream privacy in an ABR OTT network, these separate concepts can be combined in a number of ways depending on specific implementations and on whether the ABR media is provided using HTTP (i.e., using visible URLs) or using HTTPS or QUIC (i.e., invisible URLs). In the case where invisible URLs are utilized, even though the video is transmitted using end-to-end encryption, the video can still be recognized because the VBR encoding that provides efficiency during transmission also provides a fingerprint that can be recognized when the video is transmitted. The need in this instance is to provide ABR media that is customized for each client in a manner that alters the fingerprint, making the ABR media unrecognizable. Three possible workflows are discussed herein for invisible URLs: Workflow One utilizes client stream cloaking for stream privacy; Workflow Two utilizes server stream cloaking for stream privacy; and Workflow Three utilizes both client and server stream cloaking for stream privacy. In the case where visible URLs are utilized, the ABR media is even more vulnerable to attempts to access the contents. Consequently, both client and server stream cloaking for stream privacy are utilized, as well as cloaking of content and manifests for privacy under HTTP; this combination is described in Workflow Four. Other workflows not specifically described can include the use of cloaking of content and manifests for privacy under HTTP with either client stream cloaking or server stream cloaking. In any of the following workflows, the network can provide any of VOD, nDVR, live, catch-up and time-shifted services with any of the following workflows for stream privacy.

Each of the workflows discussed provide one or more of the following advantages:
- ABR OTT media assets can be encoded with VBR encoding;
- Delivery of manifests/playlists/segments for HLS and DASH are secure;
- GET requests may be for full segments or for byte-range requests;
- Manifests can be customized as to segment size and duration;
- Segment downloads can be randomized;
- Byte-ranges requests can be randomized;
- Size of manifests can be cloaked with comment tags;
- Provides stream privacy and prevents fingerprinting of the media watched;
- Prevents leaking of media identity;

No additional CDN costs;
Randomized downloads prevent ADUDMUP from finding segment boundaries;
Media segments can have main track and additional one or more sample variant tracks;
Sample variant tracks can carry fake bytes to hide size of segments;
Visible URLs may be obfuscated;

Workflow One—Client Stream Cloaking for Invisible URLs

In this first use case, client stream cloaking techniques are utilized, but no server stream cloaking techniques are employed. When an ABR OTT client device requests an ABR media asset, the manifest delivered to the requesting ABR OTT client device is the ABR manifest provided by the packager. Using Workflow One, manifests, e.g. for HLS/DASH, may be served from a content controller or from an origin server, edge server or a JIT-P that is associated with a Controlled Blind Cache. The manifest contains a segmentation-units index and specifies a segment size for each segment listed in the manifest.

At the ABR OTT client device, one of the client application and a client proxy, if present, has the ability to perform the client stream cloaking method disclosed herein. The media segments, which can be provided, e.g., in any of HLS/DASH/CMAF formats, can be served from the Controlled Blind Cache, or an origin server, edge server or JIT-P associated with the Controlled Blind Cache. The number of segmentation-units in each segment may vary. In a client application having a proxy, the downloader uses HTTPS byte range requests for segments using the client stream-cloaking techniques disclosed herein. The client proxy obtains the segment size from the manifest for byte-range downloads in order to ensure that a request does not extend beyond a segment. The client proxy may download the segments out of order and can reassemble the segments from the byte-range responses in the correct order prior to providing the segments to the local player. After assembly of the segments received from the network, which may be of variable sizes, the client proxy or client application passes fixed size segments of the ABR media asset to a media player on the ABR OTT client device.

Workflow Two—Server Stream Cloaking for Invisible URLs

In this second use case, only server stream cloaking techniques are utilized, without client stream cloaking techniques. Manifests may be served from a content controller or from an origin server, edge server or a JIT-P that is associated with a Controlled Blind Cache and are customized to provide unique segmentation of the ABR media asset for each session. On receiving a request from an ABR OTT client device for an ABR media asset, the receiving network node utilizes the network stream cloaking for stream privacy as disclosed above to deliver the manifests and segments. The segments provided in the custom manifest can provide a URL, URI or be expressed as a byte-range.

Segments can be served to the ABR OTT client device from the Controlled Blind Cache, JIT-P, origin server or edge server in response to HTTPS requests for the segments provided in the custom manifest, which expressed as a URL, URI or byte-range request. The unique segmentation can be provided by varying the number of segmentation-units in a segment, both across manifests for different clients and within a single manifest. The HLS/DASH manifests have unique playlists of segments in that the segments can vary in both duration and size for each customized manifest. A client downloader uses HTTPS requests for segments, with no stream-cloaking in the client.

Workflow Three—Client and Server Stream Cloaking for Invisible URLs

In this third workflow both the client and the server implement stream-cloaking for stream privacy, combining the previous two workflows. One the network side, any of a Controlled Blind Cache, a JIT-P, origin server or edge server may serve segments using HTTPS in response to requests for either complete segments or byte-range requests. Manifest can be served by any of a Controlled Blind Cache, origin server, edge server or JIT-P, and a content controller. Manifests may have the segment size provided as a manifest tag for each segment listed in the manifest and a custom manifest generator generates custom manifests in response to clients' device requests. The HLS/DASH manifests have customized playlists of segments in that the byte-ranges are different for each client device and the number of segments in the playlist is different in each customized manifest.

A client downloader in the client proxy or client application uses HTTPS requests for segments and the custom manifest and also utilizes client stream-cloaking techniques to further safe guard privacy. A client proxy downloads segments using HTTPS byte range requests. The client proxy may request the manifests and segments out of order, e.g., with requests for content from different segments interleaved. The client proxy reassembles the downloaded content in a proper order prior to providing the content to a media player and ensures that the segments provided to the media player have similar sizes.

Workflow Four—Client and Server Stream Cloaking for Visible URLs

In the fourth workflow, which can be performed at visible URLs that utilize only HTTP, both the ABR OTT client device and the server implement the stream-cloaking techniques that are utilized in the invisible URLs embodiment. The content controller, Controlled Cache, JIT-P, origin server or edge server provides custom manifests having customized segmentation. The ABR OTT client device may request either complete segments or byte-range HTTP requests. The requests may be provided out of order, with the client proxy or client application reassembling the contents in the correct order prior to presenting the contents to a media player.

In addition to the use of both client and server stream cloaking, stream cloaking for privacy under HTTP is performed to obscure the size of both the manifests and of segments. Custom manifests contain not only customized segmentation, but also comment tags whose size is randomly customized. URLs, URIs and byte ranges are obfuscated using, e.g., a shared obfuscation map for the ABR media asset. Obfuscated URLs, URIs and byte ranges are utilized to prevent both physical segment identification and caching by uncontrolled caches, since a segment that is unidentified is of little use to an uncontrolled cache. The Controlled Cache is operable to maintain the shared obfuscation map, which is shared only with authorized entities. Additionally, techniques for cloaking the size of content are employed to conceal the true length of the video. Media segments are encrypted and may contain one or more sample variant tracks carrying masking content that disguises the size of the media content. The combination of sample variant tracks sent to each ABR OTT client device can be randomized at the Controlled Cache by removing one or more sample variant tracks to alter the apparent size of the media, so that segments can have different sizes for the same duration content.

At the client, HTTP GET requests and HTTP byte range requests can be used to download both a custom manifest and custom segments. In the requests made to the network node, segment URLs and byte ranges may be obfuscated, e.g., by using the shared obfuscation map. The received custom manifest and customized segments may contain masking content, which can take the form of custom comment tags in the manifest and customized sample variant tracks carried in the customized segments. These requests can be performed by the client application or client proxy, which may implement stream-cloaking techniques to request the manifest and segments out of order. Prior to forwarding the media to the media player, the client or client proxy assembles the retrieved media in the correct order and provides equal-sized segments to the media player on the ABR OTT client device.

The use of both server and client stream-cloaking techniques combined with the techniques specific to HTTP stream cloaking prevents fingerprinting software from being able to identify segment boundaries within the media stream and further prevents an uncontrolled cache from caching and serving the content. In at least one embodiment, media manifests are served from the Controlled Cache, JIT-P server, origin server, edge server or content controller and are encrypted. The media, including encrypted segments containing sample variants is served from the Controlled Cache, origin server, edge serve or JIT-P server.

Figure 9:
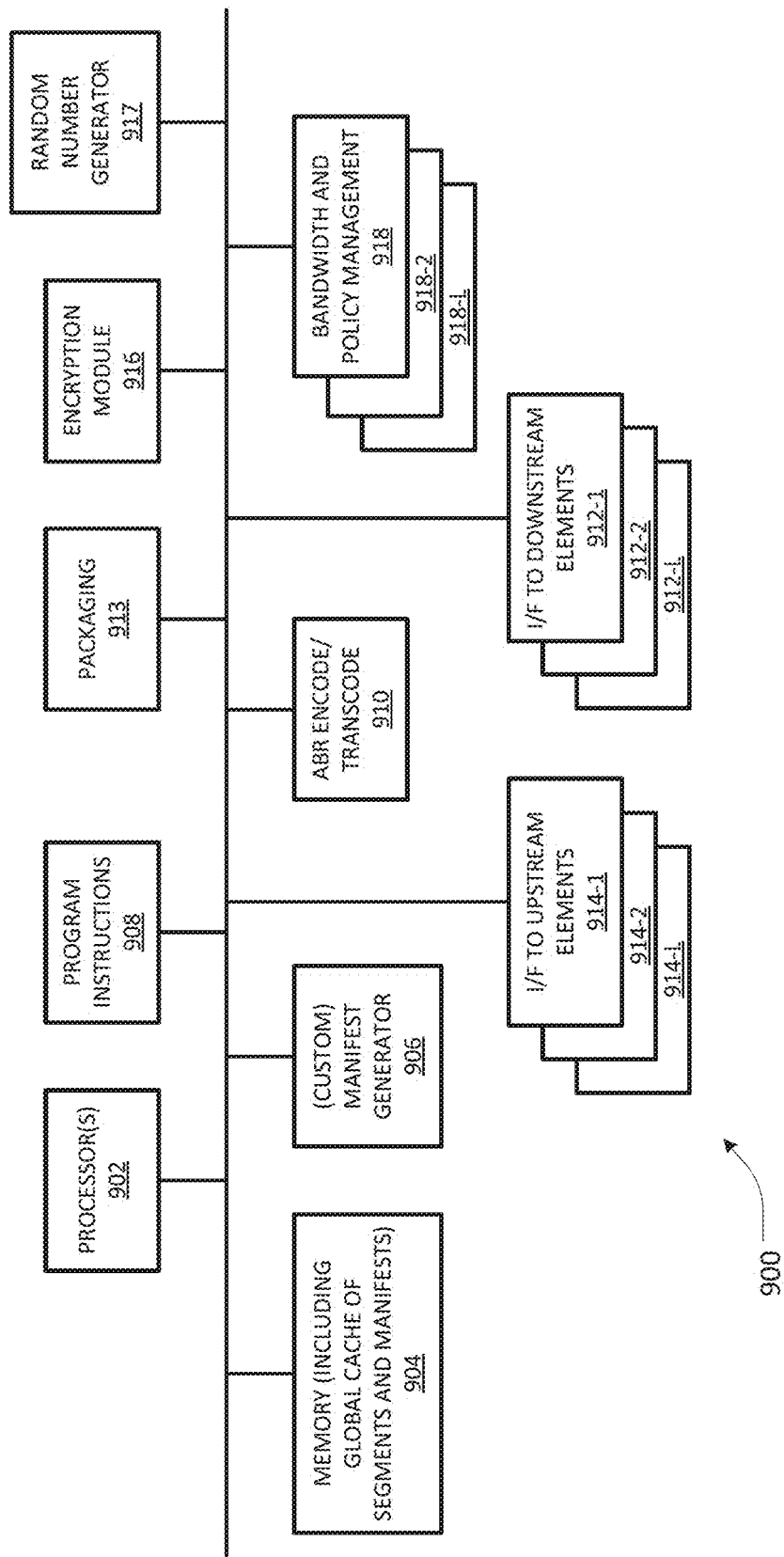
FIG. 9 a block diagram of an apparatus that may be configured or arranged as a network element or node for packaging media content assets for purposes of one or more embodiments of the present patent application.

FIG. 9 depicts a block diagram of an apparatus 900 that may be configured or arranged as a network element, subsystem or node for facilitating one or more aspects of ABR stream privacy according to an embodiment of the present patent disclosure. Depending on implementation and/or network architecture of a media communications network, apparatus 900 may be configured in different ways suitable for operation at multiple hierarchical levels, e.g., at a super headend node, regional headend node, video hub office node, ABR origin server node, etc., on the basis of where source media feeds or other content sources are injected into an example deployment. Accordingly, suitable network interfaces, e.g., I/F 914-1 to 914-L, operative for effectuating communications with other network infrastructure elements and databases (e.g., source feeds, global databases for storing encoded media fragments, metadata/manifest files, DRM entities, etc.) as well as interfaces 912-1 to 912-K for effectuating communications sessions with one or more downstream nodes, e.g., origin servers, CDNs, regional distribution centers (RDCs), ABR network elements, etc., may be provided as part of the apparatus 900. One or more processors 902 may be provided as part of a suitable computer architecture for providing overcall control of the apparatus 900, which processor(s) 902 may be configured to execute various program instructions stored in appropriate memory modules or blocks, e.g., persistent memory 904 as well as program instructions 908, including additional modules or blocks specific to client request processing, encoding/transcoding, media segmentation, CMZF containerization, etc. By way of illustration, ABR encode/transcode block 910 is operative for generating segments of multi-bitrate representations of various source media, for which suitable metadata files may be generated by a manifest generator 906. In an embodiment wherein apparatus 900 is implemented as a packager, manifest generator 906 is operative for generating a manifest for each representation of an ABR media asset. In an embodiment wherein apparatus 900 is implemented as a server associated with a Controlled Cache, manifest generator 906 is operative for generating custom manifests in response to requests for an ABR media asset from various ABR OTT client devices and may operate in conjunction with random number generator 917. A multi-encryption block 916 is operative for encrypting the content in a plurality of encryption schemes as described in detail hereinabove. A packaging block 913 is provided for packaging the media in ISOBMFF, MPEG-TS and/or CMZF formats for effectuating various levels of formatting/containerization and associated manifest generation for purposes of one or more embodiments of the present invention. In additional or alternative arrangements, a bandwidth and content policy management module, program entitlements, etc., collectively shown as modules or blocks 918, may also be provided as part of a backend management node in one example network architecture.

Figure 10:
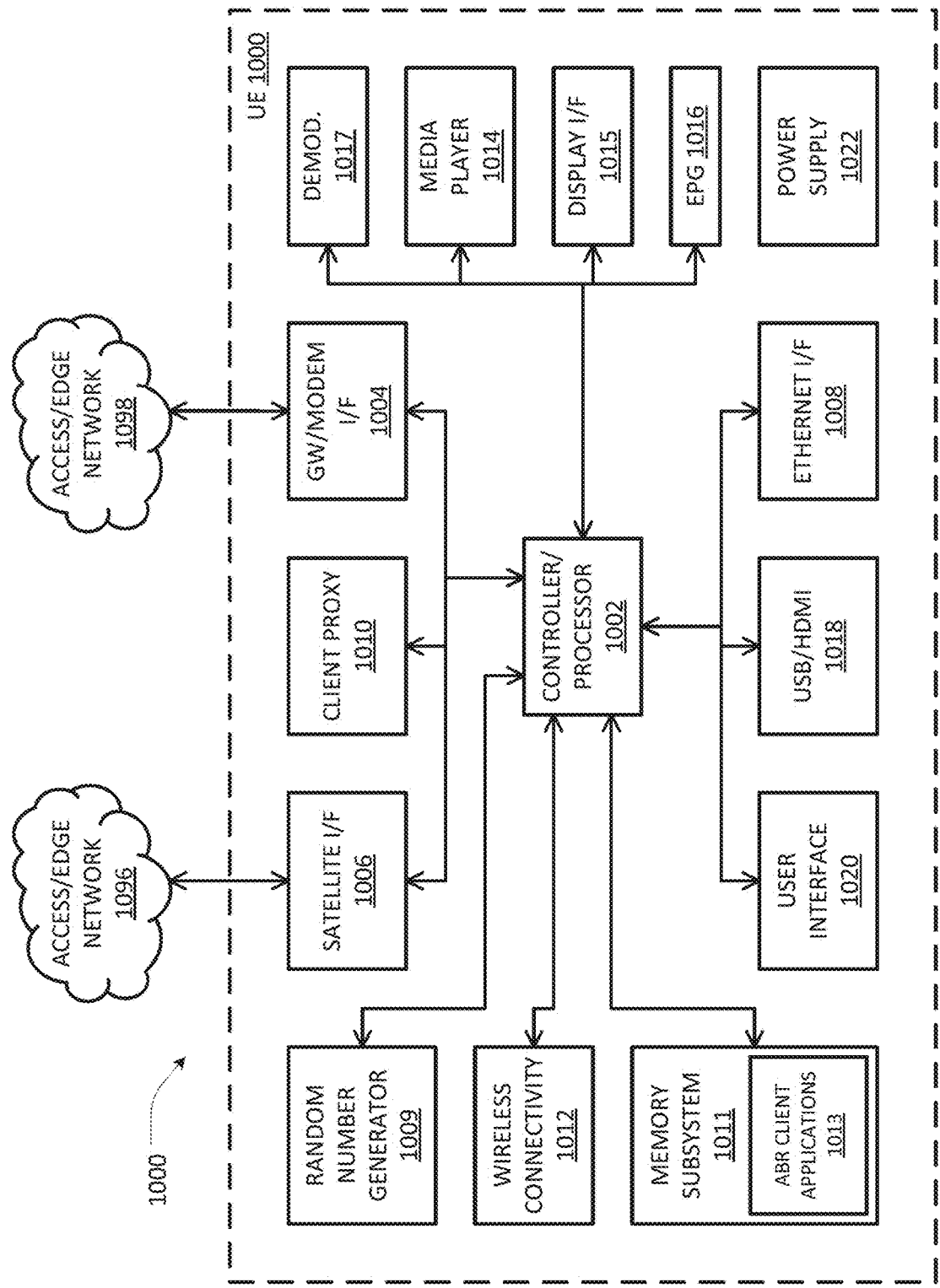
FIG. 10 depicts a block diagram of an apparatus that may be configured or arranged as a premises device or end user device for purposes of the present patent application.

FIG. 10 is a block diagram of an example client or ABR OTT client device 1000 configured for performing various client-side processes according to one or more embodiments of the present patent disclosure. ABR OTT client device 1000 is generally representative of a plurality of ABR OTT client devices, e.g., reach devices, etc., shown in one or more Figures described above, and may include appropriate hardware/software components and subsystems configured for performing any of the device-side processes (either individually or in any combination thereof) with respect to local cache access, content request generation, metadata parsing, HTTP proxy control, sample variant processing in conjunction with media segment/stream retrieval and rendering, for purposes of the present patent application, such as, e.g., facilitating MFX as well as media decrypt/decode and/or sample variants extractor functionality, among others, depending on implementation. One or more microcontrollers/processors 1002 are provided for the overall control of the ABR OTT client device 1000 and for the execution of various stored program instructions embodied in a persistent memory 1013, e.g., as a streaming client application having cache discovery capability and/or browser proxy agent, etc., that may be part of a memory subsystem 1011 of the ABR OTT client device 1000. Stored program instructions 1013 may operate in conjunction with random number generator 1009. Controller/processor complex referred to by reference numeral 1002 may also be representative of other specialty processing modules such as graphic processors, video processors, digital signal processors (DSPs), and the like, operating in association with suitable video and audio interfaces (not specifically shown). Appropriate interfaces such as network I/F modules 1004 and 1006 involving or operating with tuners, demodulators, descramblers, MPEG/H.264/H.265 decoders/demuxers may be included for processing and interfacing with IPTV and other content signals received via a DSL/CMTS network 1098 or a satellite network 1096. ABR OTT client device 1000 may include suitable demodulators 1017 as well as client proxy 1010 may also be included. One or more media players 1014 may be provided for operating in conjunction with the other subsystems of the ABR OTT client device 1000 for facilitating user control over media playback. Example media players may be configured to operate with one or more A/V coder/decoder (codec) functionalities based on known or hereto unknown standards or specifications including but not limited to, e.g., Moving Pictures Expert Group (MPEG) codecs (MPEG, MPEG-2, MPEG-4, etc.), H.264 codec, High Efficiency Video Coding or HEVC (H.265) codec, and the like.

Other I/O or interfaces such as a display interface 1015, Electronic Program Guide (EPG) 1016, touch screen or keypad user interface 1020, USB/HDMI ports 1018, Ethernet I/F 1008, and short-range and wide area wireless connectivity interfaces 1012 may also be provided depending on device configuration. A suitable power supply block 1022 may include AC/DC power conversion to provide power for the ABR OTT client device 1000. It should be appreciated that the actual power architecture for the ABR OTT client device 1000 may vary by the hardware platform used, e.g., depending upon the core SoC (System-on-Chip), memory, analog front-end, analog signal chain components and interfaces used in the specific platform, and the like.

One skilled in the art will recognize that various apparatuses, subsystems, functionalities/applications and/or one or more network elements as well as the underlying network infrastructures set forth above may be architected in a virtualized environment according to a network function virtualization (NFV) architecture in additional or alternative embodiments of the present patent disclosure. For instance, various physical resources, databases, services, applications and functions executing within an example network of the present application may be provided as virtual appliances, machines or functions, wherein the resources and applications are virtualized into suitable virtual network functions (VNFs) or virtual network elements (VNEs) via a suitable virtualization layer. Resources comprising compute resources, memory resources, and network infrastructure resources are virtualized into corresponding virtual resources wherein virtual compute resources, virtual memory resources and virtual network resources are collectively operative to support a VNF layer, whose overall management and orchestration functionality may be supported by a virtualized infrastructure manager (VIM) in conjunction with a VNF manager and an NFV orchestrator. An Operation Support System (OSS) and/or Business Support System (BSS) component may typically be provided for handling network-level functionalities such as network management, fault management, configuration management, service management, and subscriber management, etc., which may interface with VNF layer and NFV orchestration components via suitable interfaces.

Furthermore, at least a portion of an example network architecture disclosed herein may be virtualized as set forth above and architected in a cloud-computing environment comprising a shared pool of configurable virtual resources. Various pieces of hardware/software, e.g., ABR encoders, encryption systems and schemes, segmentation mechanisms, media asset packaging/containerization, CMZF segment/manifest databases, Controlled Cache functionality, etc., as well as platforms and infrastructure of NDCs, RDCs, origin servers, ABR network elements may be implemented in a service-oriented architecture, e.g., Software as a Service (SaaS), Platform as a Service (PaaS), infrastructure as a Service (IaaS) etc., with multiple entities providing different features of an example embodiment of the present invention, wherein one or more layers of virtualized environments may be instantiated on commercial off the shelf (COTS) hardware. Skilled artisans will also appreciate that such a cloud-computing environment may comprise one or more of private clouds, public clouds, hybrid clouds, community clouds, distributed clouds, multiclouds and interclouds (e.g., "cloud of clouds"), and the like.

An example decoder scheme 1100 for processing sample variant-based files (or segments) is shown in FIG. 11. ISOBMFF-containerized and multi-encrypted media content asset (or sample blocks) may be provided, generated and/or propagated from an authorized upstream node or entity 1102 wherein a plurality of sample variants (preferably time-parallel sample variants) 1106-1 to 1106-N are associated with a base sample or main track 1108, along with associated KID values/fields 1104, for the ABR media asset. A DRM entity 1110 is operative to interface with the upstream node (e.g., a headend facility, etc.) and a receiver/decoder module 1124 executing at a downstream entity (e.g., a client reach device) 1118. A Variant Constructor block 1116 is interfaced with a Variant Processor block 1114 operative to receive the encrypted media base sample and variant sample tracks. A processed output sample having a specific encryption scheme is selected by a media variant selector 1120 operating in conjunction with or as part of Variant Processor 1114. The selected encrypted output sample is provided to a decryptor module 1122 and associated decoder 1124, which together may comprise a standard CENC decoder in an example implementation involving "cens" and "cbcs" schemes. The decrypt/decode of the selected encrypted output sample is facilitated by appropriate key(s) received from DRM 1110, whereupon the decrypted/decoded sample may be presented to either a native and/or connected renderer/player (not shown) via stream 1126.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added or inserted between the blocks that are illustrated. Moreover, although some of the diagrams include arrows on communication paths to show a primary direction of communication, it is to be understood that communication may occur in the opposite direction relative to the depicted arrows.

One skilled in the art will further recognize that various apparatuses, subsystems, functionalities/applications and/or one or more network elements as well as the underlying network infrastructures set forth above providing privacy during delivery of adaptable bitrate (ABR) media content to a ABR OTT client device may be architected in a virtualized environment according to a network function virtualization (NFV) architecture in additional or alternative embodiments of the present patent disclosure. For instance, various physical resources, services, applications and functions set forth herein above with respect to an example ABR streaming network environment may be provided as virtual appliances, machines or functions, wherein the resources and applications are virtualized into suitable virtual network functions (VNFs) or virtual network elements (VNEs) via a suitable virtualization layer. In such embodiments, resources comprising compute resources, memory resources, and network infrastructure resources are virtualized into corresponding virtual resources wherein virtual compute resources, virtual memory resources and virtual network resources are collectively operative to support a VNF layer, whose overall management and orchestration functionality may be supported by a virtualized infrastructure manager (VIM) in conjunction with a VNF manager and an NFV orchestrator. An Operation Support System (OSS) and/or Business Support System (BSS) component may typically be provided for handling network-level functionalities such as network management, fault management, configuration management, service management, and subscriber management, etc., which may interface with VNF layer and NFV orchestration components via suitable interfaces.

Accordingly, at least a portion of an example network architecture disclosed herein may be virtualized as set forth above and architected in a cloud-computing environment comprising a shared pool of configurable virtual resources. Various pieces of software, e.g., TSTV operations, VMA and MSF functionalities, TS media/ad storage, subscriber management, etc., as well as platforms and infrastructure of a MABR network may be implemented in a service-oriented architecture, e.g., Software as a Service (SaaS), Platform as a Service (PaaS), infrastructure as a Service (IaaS) etc., with involved parties providing different features of an example embodiment of the present invention. Skilled artisans will also appreciate that such a cloud-computing environment may comprise one or more of private clouds, public clouds, hybrid clouds, community clouds, distributed clouds, multiclouds and interclouds (e.g., "cloud of clouds"), and the like.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method executed by a network node for providing privacy from fingerprinting of adaptive bitrate (ABR) media content during delivery of the ABR media content to a plurality of ABR OTT client devices, the method comprising:

receiving, at a Controlled Cache, an ABR manifest for an ABR media asset, the ABR manifest comprising a segmentation-units index that points to segmentation-units in the ABR media asset, wherein the network node comprises one of an origin server, an edge server, and a Just-In-Time Packager (JIT-P) and contains the Controlled Cache, and wherein the ABR media asset contains a composite segment that comprises an encrypted main track and an encrypted plurality of sample variant tracks for the ABR media asset, the plurality of sample variant tracks comprising varying amounts of masking content;

receiving, at the network node, a request for the ABR media asset from an ABR OTT client device, wherein the request is an obfuscated byte-range request for the ABR media asset; and responsive to receiving the request for the ABR media asset from the ABR OTT client device, receiving an input value, mapping the input value to a number of segmentation-units in a segment, mapping the obfuscated byte-range to a selected byte-range of the ABR media asset, generating a customized manifest according to the mapped number of segmentation-units in a segment, sending to the ABR OTT client device the generated manifest, and transmitting the selected byte-range having the encrypted main track and a customized selection of the plurality of encrypted sample variant tracks to the ABR OTT client device.

2. The method as recited in claim 1, further comprising storing the ABR manifest in the Controlled Cache.

3. The method as recited in claim 2, wherein generating the customized manifest further comprises providing segments within the customized manifest that comprise variable segment sizes and variable durations.

4. The method as recited in claim 2, wherein generating the customized manifest further comprises receiving the input value from one of a random number generator and a process that derives the input value from one or more of a subscriber identification, a client device identification, a client device location, a media identification, a media title, a segment size, a media bitrate, a maximum bitrate, and an average bitrate, the input value being between a lower bound and a segment size.

5. The method as recited in claim 1, wherein the ABR media asset is one of Video-On-Demand (VOD), Movie-On-Demand (MOD), Over-The-Top (OTT) programs, time-shifted TV (TSTV) content, Catch-up service content, and other ABR content.

6. The method as recited in claim 1, further comprising customizing the selection of encrypted sample variant tracks using one or more of a random number generator, a subscriber identification, a client device identification, a client device location, an identification of the media asset, a title of the media asset, a segment size in a manifest for the ABR media asset, a media bitrate, a maximum bitrate, and an average bitrate.

7. The method as recited in claim 1, further comprising sharing a mapping of the obfuscated byte-range requests to the selected byte-range of the ABR media asset with the ABR OTT client device.

8. The method as recited in claim 1, in which the generated manifest further includes comment tags that are customized for the ABR playback session.

9. The method as recited in claim 1, wherein the segments are sent using HTTPS.

10. A network node operating to provide privacy from fingerprinting of adaptive bitrate (ABR) media content in the delivery of the ABR media content to a subscriber, the network node comprising:
one or more processors;
an upstream interface for coupling to upstream elements;
a downstream interface for coupling to downstream elements;
a Controlled Cache coupled to receive and store ABR segments and corresponding ABR manifests; and
one or more persistent memory modules coupled to the one or more processors and comprising instructions that, when executed by the one or more processors, perform the following at one of an origin server, an edge server and a Just-In-Time Packager (JIT-P):
receiving an ABR manifest for an ABR media asset, the ABR manifest comprising a segmentation-units index that points to segmentation-units in the ABR media asset, wherein the ABR media asset contains a composite segment that comprises an encrypted main track and an encrypted plurality of sample variant tracks for the ABR media asset, the plurality of sample variant tracks comprising varying amounts of masking content;
receiving a request for the ABR media asset, wherein the request is an obfuscated byte-range request for the ABR media asset from an ABR OTT client device; and
responsive to receiving the request for the ABR media asset from the ABR OTT client device, receiving an input value, mapping the input value to a number of segmentation-units in a segment, mapping the obfuscated byte-range to a selected byte-range of the ABR media asset, generating a manifest that is customized according to the mapped number of segmentation-units in a segment, sending to the ABR OTT client device the generated manifest, and transmitting the selected byte-range having the encrypted main track and a customized selection of the plurality of encrypted sample variant tracks to the ABR OTT client device.

11. The network node as recited in claim 10, further comprising a custom manifest generator, executed by the one or more processors, to receive the ABR manifest and to derive the input value from one or more of a random number generator, a subscriber identification, a client device identification, a client device location, an identification of the ABR media asset, a title of the ABR media asset, a segment size in the ABR manifest, a media bitrate, a maximum bitrate, and an average bitrate.

12. The network node as recited in claim 10, wherein the instructions further comprise:
determining the customized selection using the input value, which is derived from one or more of a random number generator, a subscriber identification, a client device identification, a client device location, an identification of the media asset, a title of the media asset, a segment size in a manifest for the ABR media asset, a media bitrate, a maximum bitrate, and an average bitrate.

13. The network node as recited in claim 12, wherein the generated manifest includes comment tags that are customized for the ABR playback session in the ABR manifest.

14. A non-transitory computer readable medium having instructions stored thereon that when executed by a processor on a network node that comprises one of an origin server, an edge server and a Just-In-Time Packager (JIT-P) and contains a Controlled Cache, causes the network node to perform the following:
receive and store, at the Controlled Cache, an adaptive bitrate (ABR) manifest for an ABR media asset, the ABR manifest comprising a segmentation-units index that points to segmentation-units in the ABR media asset, wherein the ABR media asset contains a composite segment that comprises an encrypted main track and an encrypted plurality of sample variant tracks for the ABR media asset, the plurality of sample variant tracks comprising varying amounts of masking content;
receiving a request for the ABR media asset from an ABR OTT client device, wherein the request is an obfuscated byte-range request for the ABR media asset; and
responsive to receiving the request for the ABR media asset from the ABR OTT client device, receiving an input value, mapping the input value to a number of segmentation-units in a segment, mapping the obfuscated byte-range to a selected byte-range of the ABR media asset, generating a manifest that is customized according to the mapped number of segmentation-units in a segment, sending to the ABR OTT client device the generated manifest, and transmitting the selected byte-range having the encrypted main track and a customized selection of the plurality of encrypted sample variant tracks to the ABR OTT client device.

15. The non-transitory computer readable medium as recited in claim 14, wherein the instructions further causes the network node to perform the following:

determining the customized selection using the input value, which is derived from one or more of a random number generator, a subscriber identification, a client device identification, a client device location, an identification of the media asset, a title of the media asset, a segment size in a manifest for the ABR media asset, a media bitrate, a maximum bitrate, and an average bitrate.

\* \* \* \* \*